(12) United States Patent
Konagai et al.

(10) Patent No.: US 10,391,641 B2
(45) Date of Patent: Aug. 27, 2019

(54) COMBINATION TYPE LINK ACTUATION DEVICE

(71) Applicant: NTN CORPORATION, Osaka (JP)

(72) Inventors: Naoya Konagai, Iwata (JP); Hiroshi Isobe, Iwata (JP); Seigo Sakata, Iwata (JP); Naoki Marui, Iwata (JP); Kenzou Nose, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/928,970

(22) Filed: Mar. 22, 2018

(65) Prior Publication Data

US 2018/0207810 A1  Jul. 26, 2018

Related U.S. Application Data

(63) Continuation of application No. PCT/JP2016/077935, filed on Sep. 23, 2016.

(30) Foreign Application Priority Data

Sep. 24, 2015  (JP) .................................. 2015-186659

(51) Int. Cl.
*B25J 17/00* (2006.01)
*B25J 17/02* (2006.01)
(Continued)

(52) U.S. Cl.
CPC ................. *B25J 17/00* (2013.01); *B25J 5/04* (2013.01); *B25J 9/0018* (2013.01); *B25J 9/0048* (2013.01);
(Continued)

(58) Field of Classification Search
CPC ........ B25J 9/0048; B25J 9/009; B25J 9/0084; B25J 9/0018
See application file for complete search history.

(56) References Cited

U.S. PATENT DOCUMENTS 5,893,296 A   4/1999  Rosheim
6,719,506 B2  4/2004  Chang et al.
(Continued)

FOREIGN PATENT DOCUMENTS

EP   0 987 087 A2   3/2000
JP   2000-94245 A   4/2000
(Continued)

OTHER PUBLICATIONS

English Translation by WIPO of the International Preliminary Report on Patentability for International Patent Application No. PCT/JP2016/077935 dated Apr. 5, 2018, 5 pgs.
(Continued)

*Primary Examiner* — Jake Cook

(57) ABSTRACT

A combination link actuation device has two link actuation devices combined with each other. Each link actuation device is provided so as to connect a distal end side link hub to a proximal end side link hub such that an orientation of the distal end side link hub is changed relative to the proximal end side link hub through three link mechanisms aligned in a circumferential direction. An orientation controlling actuator is provided in two or more link mechanisms among the three link mechanisms to optionally change an orientation of the distal end side link hub relative to the proximal end side link hub. At least one circumferential separation angle among separation angles of the three link mechanisms is greater than 120°. The two link actuation devices are disposed such that portions, of the link mechanisms, where the separation angle is greater than 120° oppose each other.

5 Claims, 20 Drawing Sheets

(51) Int. Cl.
  *B25J 18/00* (2006.01)
  *F16H 21/46* (2006.01)
  *F16H 21/44* (2006.01)
  *B25J 5/04* (2006.01)
  *B25J 9/00* (2006.01)

(52) U.S. Cl.
  CPC ............ *B25J 9/0087* (2013.01); *F16H 21/44* (2013.01); *F16H 21/46* (2013.01); *Y10S 901/28* (2013.01)

(56) References Cited

U.S. PATENT DOCUMENTS

| | | | |
|---|---|---|---|
| 9,316,266 | B2 | 4/2016 | Isobe et al. |
| 9,522,469 | B2 | 12/2016 | Isobe et al. |
| 2009/0143907 | A1 | 6/2009 | Demathelin et al. |
| 2014/0230594 | A1* | 8/2014 | De Bie ............... B25J 18/00 74/490.01 |
| 2014/0248965 | A1 | 9/2014 | Isobe et al. |
| 2015/0088308 | A1 | 3/2015 | Isobe et al. |
| 2016/0263641 | A1* | 9/2016 | Savoy ................ B62D 65/024 |
| 2016/0332295 | A1* | 11/2016 | Brog Rdh ............. B25J 9/0051 |

FOREIGN PATENT DOCUMENTS

| | | |
|---|---|---|
| JP | 2005-147333 A | 6/2005 |
| JP | 2005-226777 | 8/2005 |
| JP | 2013-121652 | 6/2013 |
| JP | 2013-198942 A | 10/2013 |
| JP | 2014-5926 A | 1/2014 |
| WO | WO 2016/035564 A1 | 3/2016 |

OTHER PUBLICATIONS

International Search Report dated Nov. 1, 2016 in corresponding International Patent Application No. PCT/JP2016/077935.
Japanese Office Action dated Jun. 4, 2019 in related Japanese Patent Application No. 2015-186659 with English translation (16 pages).
Extended and Supplementary Search Report dated May 10, 2019 in related European Patent Application No. 16 848 627.2.

\* cited by examiner

PRIOR ART

COMBINATION TYPE LINK ACTUATION DEVICE

CROSS REFERENCE TO THE RELATED APPLICATION

This application is a continuation application, under 35 U.S.C. § 111(a) of international patent application No. PCT/JP2016/077935, filed Sep. 23, 2016, which claims priority to Japanese patent application No. 2015-186659, filed Sep. 24, 2015, the entire disclosure of which is herein incorporated by reference as a part of this application.

BACKGROUND OF THE INVENTION

Field of the Invention

The present invention relates to a combination type link actuation device in which two link actuation devices capable of operating at high speed with high accuracy in wide operation ranges are combined with each other.

Description of Related Art

A parallel link mechanism and a link actuation device for use in various work devices such as medical devices and industrial devices have been known in Patent Documents 1, 2, and 3.

Although the parallel link mechanism disclosed in Patent Document 1 has a relatively simple structure, the operating angle of each link is small. Therefore, a problem arises that, if the operation range of a travelling plate is increased, a link length increases, and thus, the dimensions of the entirety of the mechanism increase and the apparatus increases in size. A problem also arises that the stiffness of the entirety of the mechanism is low, and the weight of a tool mounted on the travelling plate, that is, the weight capacity of the travelling plate is thus limited to a small value.

The link actuation device disclosed in Patent Document 2 or Patent Document 3 uses a parallel link mechanism in which a distal end side link hub is connected to a proximal end side link hub through three or more quadric chain link mechanisms so that the orientation of the distal end side link hub can be changed relative to the proximal end side link hub. By so doing, the link actuation device can operate at a high speed with high accuracy in a wide operation range while it is compact.

RELATED DOCUMENT

Patent Document

[Patent Document 1] JP Laid-open Patent Publication No. 2000-094245
[Patent Document 2] U.S. Pat. No. 5,893,296
[Patent Document 3] JP Laid-open Patent Publication No. 2014-005926

In order to widen the operation ranges of the link actuation devices disclosed in Patent Documents 2 and 3, use of two link actuation devices in combination with another mechanism has been examined. For example, in a situation in which components flow in a set at the right and left sides on a conveyor line in an automobile component production line or the like, performing work such as grease application, inspection and assembling on the flowing components is assumed.

FIG. 21 illustrates an examination example of a combination type link actuation device having two link actuation devices combined with each other. A combination type link actuation device 1 of the examination example performs work on two workpieces 2 placed on a floor surface 4, by using two end effectors 3 that are supported by two link actuation devices 7, respectively, such that the orientation of the two end effectors 3 can be changed. Each of the link actuation devices 7 is mounted to XY stages 6, set at a top plate 5, and is independently movable in the left-right direction (X-axis direction) and the front-rear direction (Y-axis direction) in the drawings. FIG. 21 illustrates a state where the two link actuation devices 7 are closest to each other, and work on the two workpieces 2 is performed by the two end effectors 3.

In the conventional link actuation device 7, three or more link mechanisms 14 are disposed at equal intervals in the circumferential direction. For example, when the number of the link mechanisms 14 is three, all of separation angles $\delta 1$, $\delta 2$ and $\delta 3$, in the circumferential direction, of the three link mechanisms 14 are 120° as shown in FIG. 22. Each of the link mechanisms 14 has an orientation controlling actuator 10 that changes an orientation of a distal end side link hub 13 relative to a proximal end side link hub 12, which actuator 10 is disposed at the proximal end side link hub 12 so as to project outward.

When the three link mechanisms 14 are disposed at equal intervals as described above, the orientation controlling actuator 10 for one of the two link actuation devices 7 projects toward the other of the two link actuation devices 7 in whatever manner the orientation of the link actuation device 7 around the vertical axis is changed. Therefore, if the two link actuator devices 7 are excessively close to each other, the orientation controlling actuators 10 for the two link actuator devices 7 interfere with each other. In order to avoid such an interference, the workpieces 2, 2 need to be placed such that a distance d between the two workpieces 2, 2 is increased. As a result, a problem arises that a large workpiece transporting tool needs to be used for carrying-in and carrying-out of the workpieces, and also, the entirety of the size of the combination type link actuation device is increased in the left-right direction.

SUMMARY OF THE INVENTION

An object of the present invention is to provide a combination type link actuation device in which two link actuation devices capable of operating at high speed and with high accuracy in wide operation ranges are combined with each other, which can perform work in a state where the two link actuation devices are close to each other, while it is compact as a whole.

A combination type link actuation device of the present invention has two link actuation devices combined with each other. Each link actuation device comprises: a proximal end side link hub; a distal end side link hub; and three link mechanisms that are aligned in a circumferential direction, which tree link mechanisms connect the proximal end side link hub and the distal end side link hub such that an orientation of the distal end side link hub is changed relative to the proximal end side link hub. Each link mechanism includes: a proximal side end link member having one end that are rotatably connected to the proximal end side link hub; a distal side end link member having one end that are rotatably connected to the distal end side link hub; and an intermediate link member having opposite ends that are rotatably connected to the other ends of the proximal side end link member and the distal side end link member, respectively. An orientation controlling actuator is provided in two or more link mechanisms among the three link mechanisms to optionally change an orientation of the distal end side link hub relative to the proximal end side link hub. At least one separation angle among separation angles, in the circumferential direction, of the three link mechanisms is greater than 120°. The respective link mechanisms with the separation angle greater than 120° in the two link actuation devices are disposed to confront with each other.

The separation angle is correctly an angle formed by the center axis of the revolute pair between the proximal end side link hub and the proximal side end link member in one link mechanism of the two link mechanisms adjacent to each other, and the center axis of the revolute pair between the proximal end side link hub and the proximal side end link member in the other link mechanism thereof. Furthermore, the separation angle is an angle formed by the center axis of the revolute pair between the distal end side link hub and the distal side end link member in one link mechanism of the two link mechanisms adjacent to each other, and the center axis of the revolute pair between the distal end side link hub and the distal side end link member in the other link mechanism thereof. In each of the three link mechanisms, a geometrical model that represents the link members as straight lines represents a shape in which the proximal end side portion and the distal end side portion are symmetric with respect to the center portion of the intermediate link member.

According to this configuration, at least one separation angle among the three separation angles is greater than 120°, and the respective link mechanisms with the separation angle greater than 120° in the two link actuation devices are disposed to confront with each other. Therefore, the two link actuation devices can be positioned so as to be close to each other. Therefore, for example, in a case where work is performed on the two or more workpieces disposed in parallel by the end effectors disposed in the distal end side link hubs, a distance between the workpieces can be reduced. Thus, a workpiece transporting tool used for carrying the workpieces into and from a working position, can be reduced in size. Furthermore, a space occupied by the two link actuation devices is reduced, and the entirety of the combination type link actuation device is made compact.

In the link actuation device, the proximal end side link hub, the distal end side link hub and the three or more sets of the link mechanisms cooperate together to form a two-degrees-of-freedom mechanism in which the distal end side link hub is rotatable about two orthogonal axes relative to the proximal end side link hub. The two-degrees-of-freedom mechanism can allow a range in which the distal end side link hub operates, to be widened while it is compact. For example, the maximum value of a bend angle between the center axis of the proximal end side link hub and the center axis of the distal end side link hub can be made about ±90°. An angle of traverse of the distal end side link hub relative to the proximal end side link hub can be set in a range between 0° to 360°.

Thus, the link actuation device allows an operation range to be widened while it is compact. Therefore, a part of the mechanism for changing orientation is rarely positioned around the end effector as compared to a case where the orientation of the end effector is similarly changed by using another mechanism. Thus, the end effector can be made close to the workpiece so as to perform work thereon, and also, the entirety of the combination type link actuation device can be made more compact.

In the present invention, the link actuation device may be attached to one or more linear motion actuator. According to this configuration, for example, in a case where work is performed on a workpiece by the end effector provided in the distal end side link hub, the work can be performed at various angles. A complicated work can be performed by controlling the two link actuation devices and the linear motion actuator so as to cooperate with each other.

In the present invention, one separation angle among the three separation angles may be 180°. In this case, interference between the orientation controlling actuators of the two link actuation devices can be eliminated, and thus, the two link actuation devices can be disposed so as to be close to each other.

In the present invention, an arm angle is an angle formed by: a center axis of a revolute pair between the proximal end side link hub and the proximal side end link member; and a center axis of a revolute pair between the proximal side end link member and the intermediate link member, and is an angle formed by: a center axis of a revolute pair between the distal side end link member and the distal end side link hub; and a center axis of a revolute pair between the distal side end link member and the intermediate link member, and the arm angle may be not greater than 90°. However, use of this configuration is limited to a case where, in a geometrical model that represents each link member of the link mechanism as a straight line, the proximal end side portion and the distal end side portion are mirror-symmetric with respect to the center portion of the intermediate link member. When the arm angle is not greater than 90°, interference among the link members is less likely to occur, and thus, an operation range of the link actuation device is widened. Furthermore, a space among the proximal side end and distal side end link members can be assured. Therefore, carrying-in and carrying-out of the workpiece disposed in the link actuation device, attaching and detaching of the end effector, and maintenance of the end effector can be facilitated.

In the present invention, at least one of the proximal end side link hub and the distal end side link hub may have a U-shape which is opened on a side where the separation angle is greater than 120°, as viewed in a direction perpendicular to a plane on which the proximal side and distal side end link members of the three link mechanisms are aligned. In this case, carrying-in and carrying-out of the workpiece disposed in the link actuation device, attaching and detaching of the end effector, and maintenance of the end effector can be facilitated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
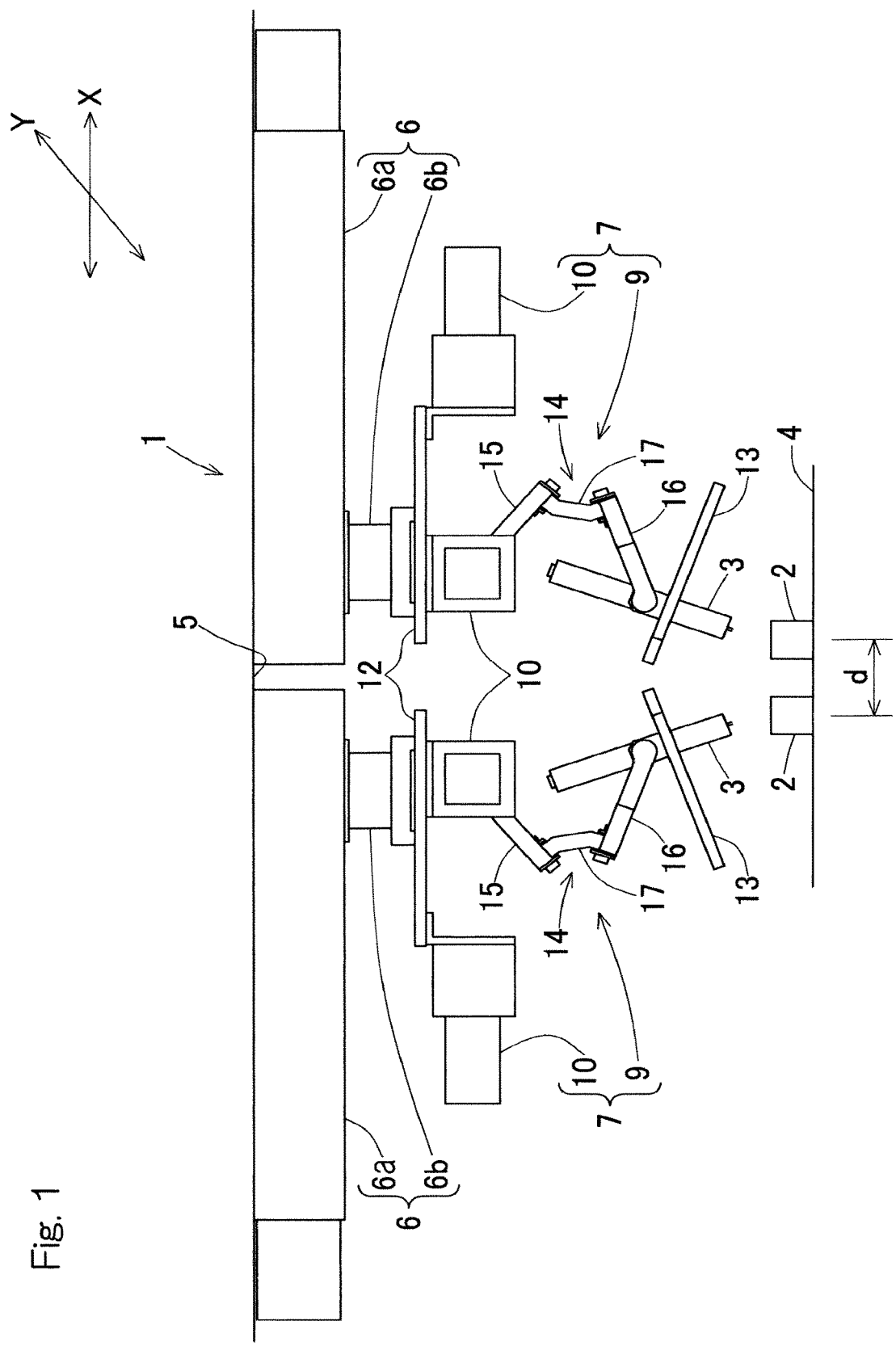
FIG. 1 is a front view of a combination type link actuation device according to a first embodiment of the present invention.
Figure 2:
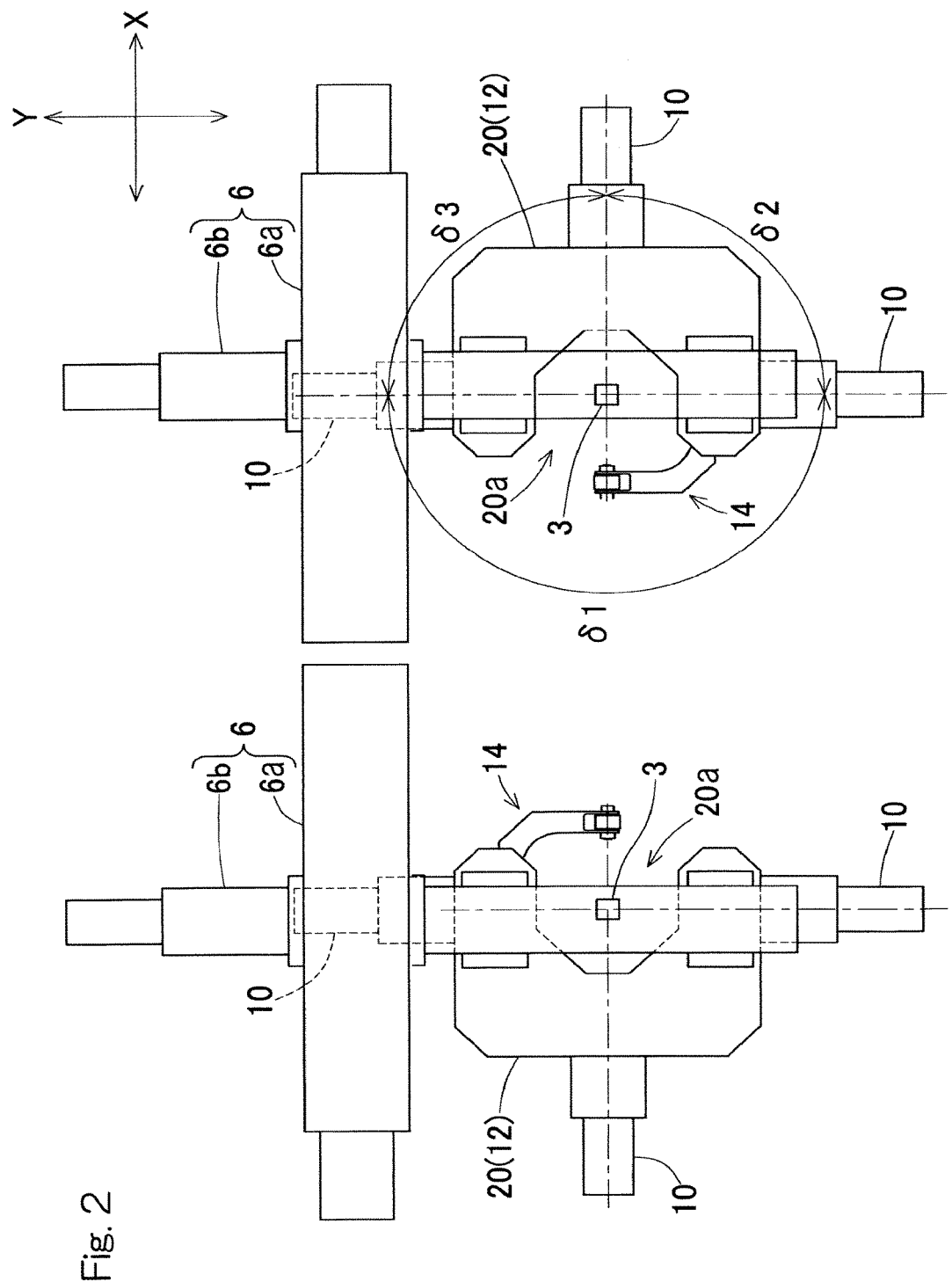
FIG. 2 is a plan view of the combination type link actuation device.

A combination type link actuation device using a link actuation device according to a first embodiment of the present invention will be described with reference to FIG. 1 to FIG. 10. FIG. 1 is a front view of the combination type link actuation device, and FIG. 2 is a plan view thereof. An operating state of the combination type link actuation device is different between FIG. 1 and FIG. 2. A combination type link actuation device 1 performs work on two workpieces 2 by using two end effectors 3. The two workpieces 2 are placed on a horizontal floor surface 4 or conveyor so as to be aligned over a predetermined distance d between the two workpieces 2, 2 in a left-right direction (X-axis direction). The two end effectors 3 are movable, above the two workpieces 2, in the left-right direction (X-axis direction) and a front-rear direction (Y-axis direction), and the orientations of the two end effectors 3 can be changed, such that the two end effectors 3 can perform work on the workpieces 2 from thereabove. The end effector 3 performs work on the workpiece 2 in a non-contact manner and is, for example, a grease application machine, a laser inspection machine, a spray type coating machine, or a welding machine.

Two XY stages 6 are set at a top plate 5, which stage 6 moves the two end effectors 3 individually in the left-right direction (X-axis direction) and the front-rear direction (Y-axis direction). Each XY stage 6 has an X-axis linear motion actuator 6a for moving the end effector 3 in the left-right direction (X-axis direction) and a Y-axis linear motion actuator 6b for moving the end effector 3 in the front-rear direction (Y-axis direction), both of which actuators 6a, 6b are used in combination. A link actuation device 7 is attached to each of the two XY stages 6 so as to be suspended. The link actuation device 7 changes orientation of the end effector 3.

Figure 3:
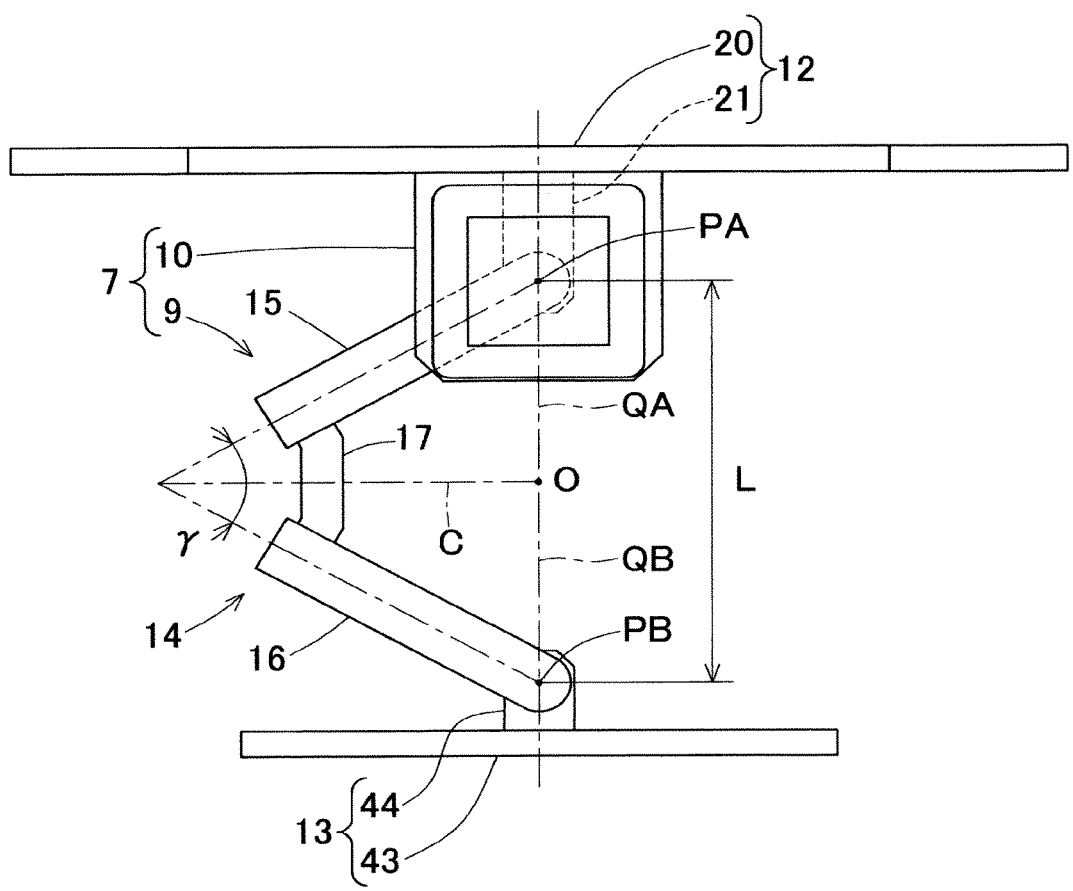
FIG. 3 is a front view of a part of one link actuation device of the combination type link actuation device.
Figure 4:
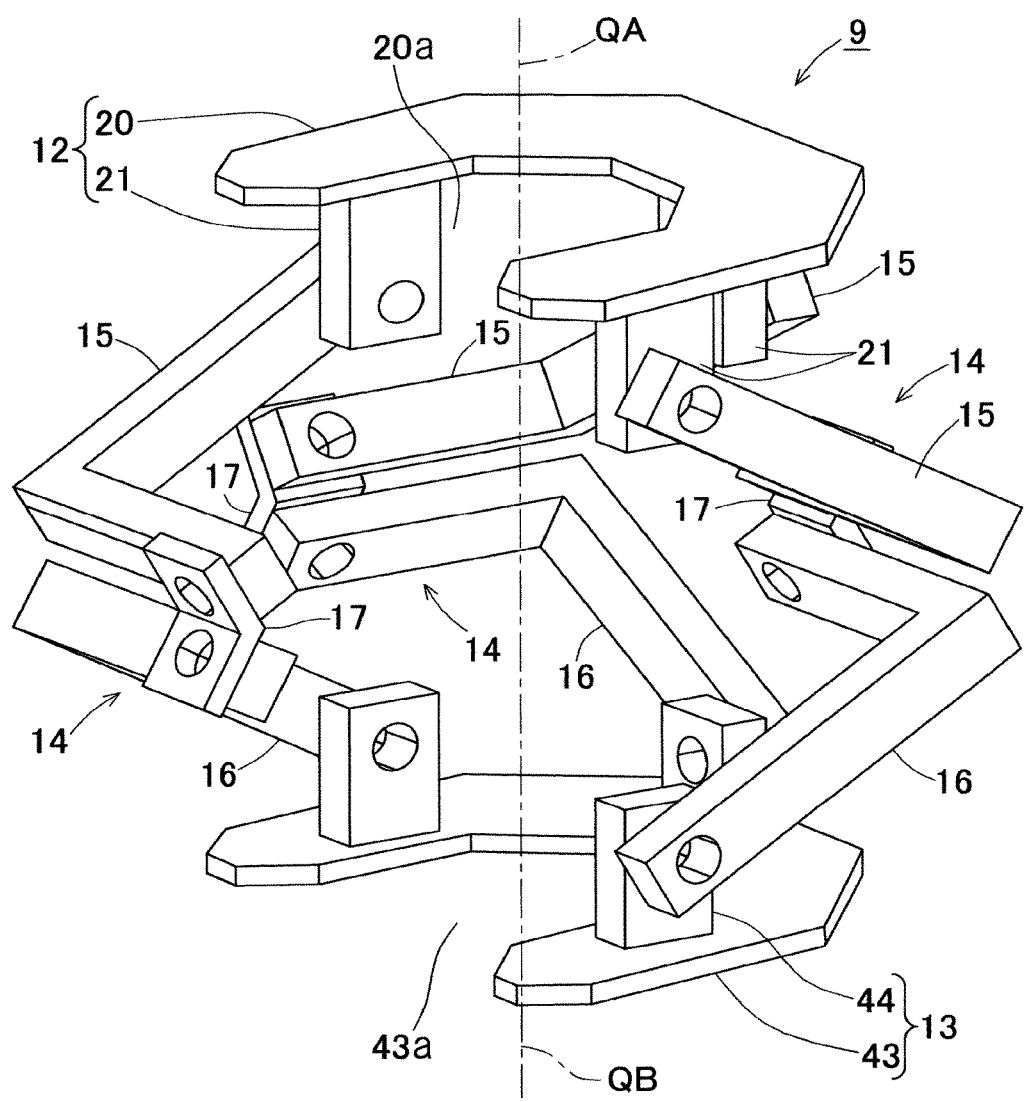
FIG. 4 is a perspective view of a parallel link mechanism of the link actuation device.

As shown in FIG. 3, the link actuation device 7 includes a parallel link mechanism 9 and three orientation controlling actuators 10 that operate the parallel link mechanism 9. The parallel link mechanism 9 connects a distal end side link hub 13 to a proximal end side link hub 12 so as to change the orientation of the distal end side link hub 13 relative to the proximal end side link hub 12 through three sets of link mechanisms 14 aligned in the circumferential direction. FIG. 3 merely illustrates one set of the link mechanism 14. In practice, as shown in FIG. 4, three sets of the link mechanisms 14 are provided in each of the parallel link mechanism 9.

Each link mechanism 14 includes a proximal side end link member 15, a distal side end link member 16 and an intermediate link member 17, to form a quadric chain link mechanism having four revolute pairs. As shown in FIG. 4, the proximal side end link member 15 and the distal side end link member 16 are L-shaped. One end the proximal side end link member 15 is rotatably connected to the proximal end side link hub 12, and one end the distal side end link member 16 is rotatably connected to the distal end side link hub 13. Opposite ends of the intermediate link member 17 are rotatably connected to the other end of the proximal side end link member 15 and the other end of the distal side end link member 16, respectively.

The parallel link mechanism 9 has two spherical link mechanisms combined with each other. The center axis of revolute pair between the proximal end side link hub 12 and the proximal side end link member 15 and the center axis of revolute pair between the proximal side end link member 15 and the intermediate link member 17 intersect each other at a spherical link center PA (FIG. 3). The center axis of revolute pair between the distal end side link hub 13 and the distal side end link member 16 and the center axis of revolute pair between the distal side end link member 16 and the intermediate link member 17 intersect each other at a spherical link center PB (FIG. 3). A distance from the spherical link center PA to the revolute pair between the proximal end side link hub 12 and the proximal side end link member 15 is equal to each other, and a distance from the spherical link center PA to the revolute pair between the proximal side end link member 15 and the intermediate link member 17 is also equal to each other. A distance from the spherical link center PB to the revolute pair between the distal end side link hub 13 and the distal side end link member 16 is equal to each other, and a distance from the spherical link center PB to the revolute pair between the distal side end link member 16 and the intermediate link member 17 is also equal to each other. The center axis of the revolute pair between the proximal side end link member 15 and the intermediate link member 17 may form a certain cross angle γ (FIG. 3) relative to the distal side end link member 16, or may be parallel to it.

Figure 5:
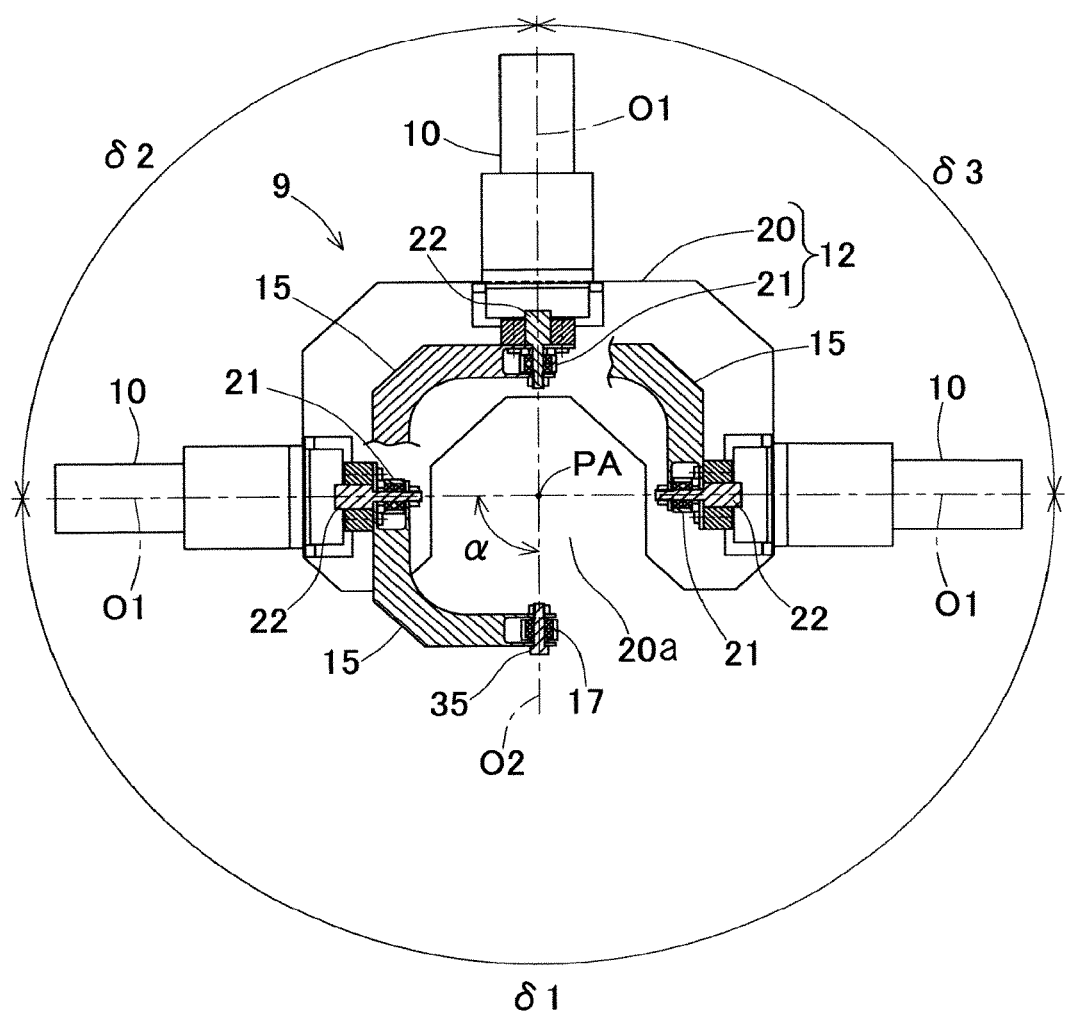
FIG. 5 is a partially cutaway view of the link actuation device as viewed from the center portion thereof toward a proximal end side.
Figure 6:
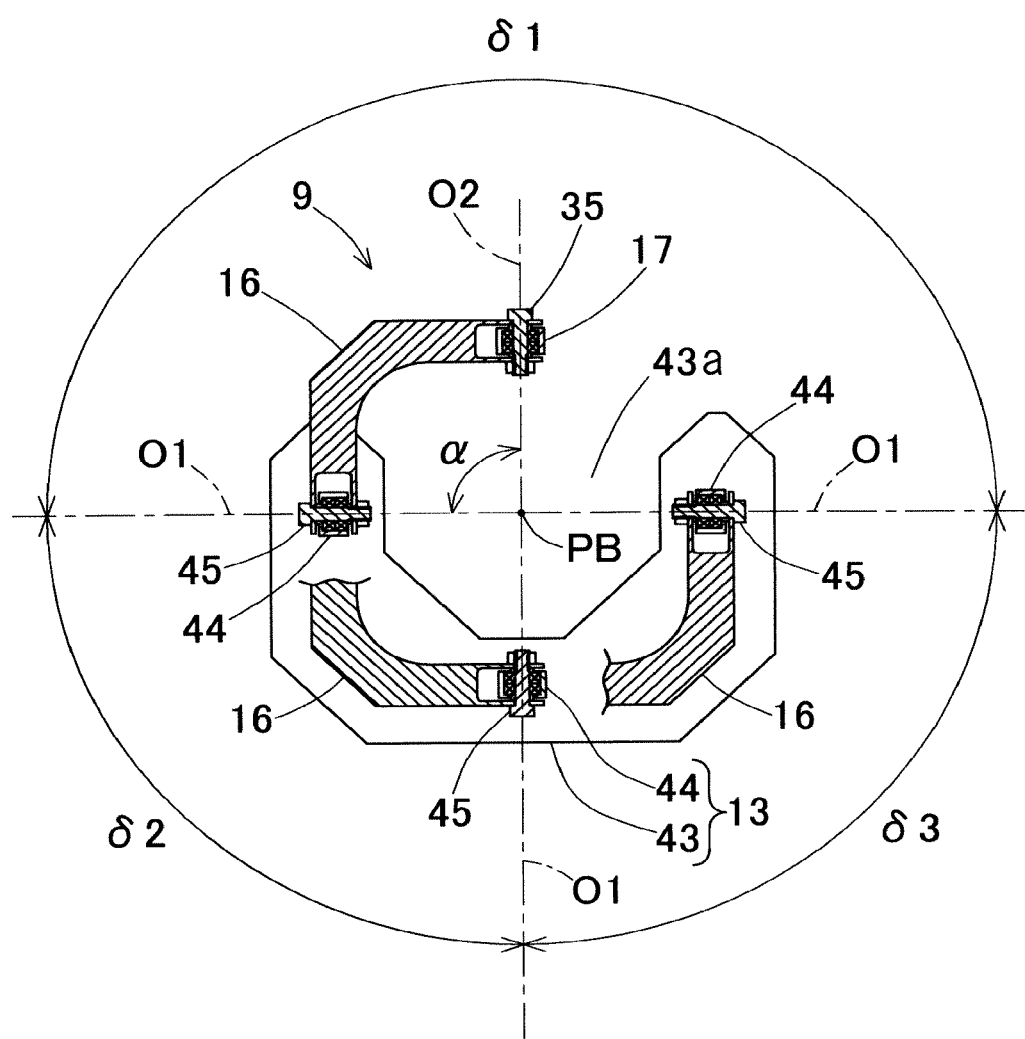
FIG. 6 is a partially cutaway view of the link actuation device as viewed from the center portion thereof toward a distal end side.

FIG. 5 is a partially cutaway view of the link actuation device as viewed from the center portion thereof toward the proximal end side. FIG. 6 is a partially cutaway view of the link actuation device as viewed from the center portion thereof toward the distal end side. FIG. 5 and FIG. 6 show a relationship among a center axis O1 of the revolute pairs between the proximal end side link hub 12 (distal end side link hub 13) and the proximal side end link member 15 (distal side end link member 16), a center axis O2 of the revolute pair between the proximal side end link member 15 (distal side end link member 16) and the intermediate link member 17, and the spherical link center PA (spherical link center PB). In the illustrated example, an arm angle α formed by the center axis O1 of the revolute pair between the proximal end side link hub 12 (distal end side link hub 13) and the proximal side end link member 15 (distal side end link member 16), and the center axis O2 of the revolute pair between the proximal side end link member 15 (distal side end link member 16) and the intermediate link member 17 is 90°. However, the arm angle α may be an angle other than 90° as described below.

Furthermore, the three link mechanisms 14 are disposed at unequal intervals in the circumferential direction. That is, at least a separation angle δ1 among separation angles δ1, δ2 and δ3, in the circumferential direction, of the link mechanisms 14 is greater than 120°. In this example, the greatest separation angle or the separation angle δ1 is 180°, and the other separation angles or the separation angles δ2 and δ3 are each 90°.

Each of the separation angles δ1, δ2, δ3 is correctly formed by the center axis O1 of the revolute pair between the proximal end side link hub 12 and the proximal side end link member 15 in one link mechanism 14 of the two link mechanisms 14 adjacent to each other, and the center axis O1 of the revolute pair between the proximal end side link hub 12 and the proximal side end link member 15 in the other link mechanism 14 thereof. The separation angle δ1, δ2, δ3 is formed by the center axis O1 of the revolute pair between the distal end side link hub 13 and the distal side end link member 16 in one link mechanism 14 of the two link mechanisms 14 adjacent to each other, and the center axis O1 of the revolute pair between the distal end side link hub 13 and the distal side end link member 16 in the other link mechanism 14 thereof.

Figure 7:
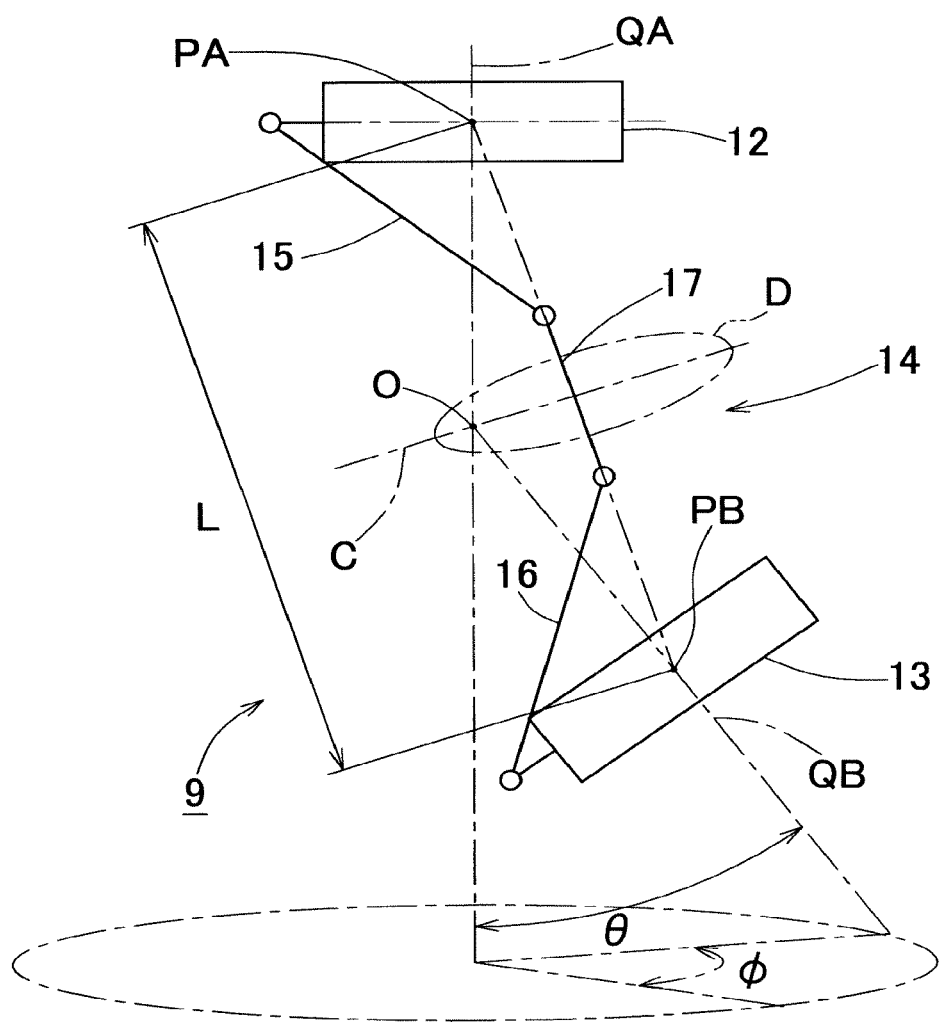
FIG. 7 illustrates one link mechanism, of the parallel link mechanism, which is represented as a straight line.

The three link mechanisms 14 have the geometrically same shape with each other. As shown in FIG. 7, a geometrical model that represents the link members 15, 16, 17 as straight lines, that is, a model that represents the revolute pairs and straight lines connecting between these revolute pairs represents a shape in which a proximal end side portion and a distal end side portion are symmetric with respect to a center portion of the intermediate link member 17. FIG. 7 illustrates one set of the link mechanism 14 as a straight line. The parallel link mechanism 9 is of a mirror-symmetric type, and a positional relationship between: the proximal end side portion composed of the proximal end side link hub 12 and the proximal side end link member 15; and the distal end side portion composed of the distal end side link hub 13 and the distal side end link member 16 represents mirror symmetry with respect to the center line C of the intermediate link member 17. The center portion of each intermediate link member 17 of the three link mechanisms 14 is positioned at a common orbital circle D.

The proximal end side link hub 12, the distal end side link hub 13, and three sets of the link mechanisms 14 cooperate together to form a two-degrees-of-freedom mechanism in which the distal end side link hub 13 is rotatable about two orthogonal axes relative to the proximal end side link hub 12. In other words, in this mechanism, the orientation of the distal end side link hub 13 can be changed relative to the proximal end side link hub 12 by rotation with two degrees of freedom. The two-degrees-of-freedom mechanism can allow a range, in which the distal end side link hub 13 operates relative to the proximal end side link hub 12, to be widened while it is compact.

A straight line that pass through the spherical link center PA and that intersect the center axis O1 (FIG. 5) of the revolute pair between the proximal end side link hub 12 and the proximal side end link member 15 at a right angle is defined as a center axis QA of the proximal end side link hub 12. A straight line that pass through the spherical link center PB and that intersect the center axis O1 (FIG. 6) of the revolute pair between the distal end side link hub 13 and the distal side end link member 16 at a right angle is defined as a center axis QB of the distal end side link hub 13. In this case, the maximum value of a bend angle θ (FIG. 7) between the center axis QA of the proximal end side link hub 12 and the center axis QB of the distal end side link hub 13 can be made about ±90°. An angle φ of traverse (FIG. 7) of the distal end side link hub 13 relative to the proximal end side link hub 12 can be set in a range between 0° to 360°. The bend angle θ is a vertical angle formed when the center axis QB of the distal end side link hub 13 is tilted relative to the center axis QA of the proximal end side link hub 12. The angle φ of traverse is a horizontal angle formed when the center axis QB of the distal end side link hub 13 is tilted relative to the center axis QA of the proximal end side link hub 12.

The orientation of the distal end side link hub 13 relative to the proximal end side link hub 12 is changed by using, as a rotation center, a point O of intersection of the center axis QA of the proximal end side link hub 12 and the center axis QB of the distal end side link hub 13. FIG. 3 and FIG. 4 illustrate a state where the center axis QA of the proximal end side link hub 12 and the center axis QB of the distal end side link hub 13 are on the same line. Even when the orientation of the distal end side link hub 13 relative to the proximal end side link hub 12 changes, a distance L (FIG. 3, FIG. 7) between the proximal end side and the distal end side spherical link centers PA and PB does not change.

In the parallel link mechanism 9, in a case where the subsequent conditions are satisfied, when angular positional relationships between the intermediate link member 17 and the proximal side end link member 15 (distal side end link member 16) with respect to the center line C of the intermediate link member 17 are made the same, the proximal end side portion composed of the proximal end side link hub 12 and the proximal side end link member 15 operate in the same manner as the distal end side portion composed of the distal end side link hub 13 and the distal side end link member 16 due to geometrical symmetry. Those conditions are that: an angle of the center axis O1 of the revolute pair between the proximal end side link hub 12 (distal end side link hub 13) and the proximal side end link member 15 (distal side end link member 16) in each link mechanism 14 are equal to each other; the length from the spherical link center PA (spherical link center PB) to the revolute pair between the proximal end side link hub 12 (distal end side link hub 13) and the proximal side end link member 15 (distal side end link member 16) is equal to each other; the center axis O1 of the revolute pair between the proximal end side link hub 12 (distal end side link hub 13) and the proximal side end link member 15 (distal side end link member 16) in each link mechanism 14 and the center axis O2 of the revolute pair between the proximal side end link member 15 (distal side end link member 16) and the intermediate link member 7 intersect with each other on the spherical link center PA (spherical link center PB); the proximal side end link member 15 and the distal side end link member 16 have the geometrically same shape; and the intermediate link member 17 has the same shape on the proximal end side and the distal end side.

As shown in FIG. 4 and FIG. 5, the proximal end side link hub 12 includes a proximal member 20 formed by a U-shaped plate member, and three rotation shaft connection members 21 that are integrated with the proximal member 20. The three rotation shaft connection members 21 are provided at the center portion and both end portions of the proximal member 20 that is U-shaped. As shown in FIG. 5, a rotation shaft 22 is rotatably supported by each rotation shaft connection member 21, and the one end of the proximal side end link member 15 is connected to the rotation shaft 22. The axis of the rotation shaft 22 coincides with the center axis O1 of the revolute pair between the proximal end side link hub 12 and the proximal side end link member 15. In the U-shaped proximal member 20, the opening side of a center recess 20a is a side where the separation angle δ1 is 180°.

Furthermore, as shown in FIG. 4 and FIG. 6, the distal end side link hub 13 includes a distal member 43 formed by a U-shaped plate member, and three rotation shaft connection members 44 that are integrated with the distal member 43. The three rotation shaft connection members 44 are provided at the center portion and both end portions of the distal member 43 that is U-shaped. As shown in FIG. 6, a rotation shaft 45 is rotatably supported by each rotation shaft connection member 44, and the one end of the distal side end link member 16 is connected to the rotation shaft 45. The axis of the rotation shaft 45 coincides with the center axis O1 of the revolute pair between the distal end side link hub 13 and the distal side end link member 16. In the U-shaped distal member 43, the opening side of a center recess 43a is a side where the separation angle δ1 is 180°.

Figure 8:
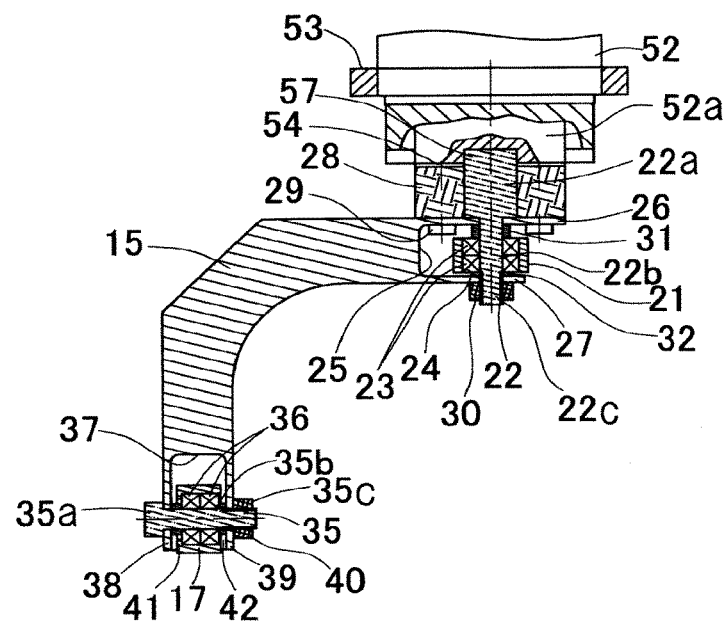
FIG. 8 is a partially enlarged view of FIG. 5.

A structure for connecting between the proximal end side link hub 12 and the proximal side end link member 15, a structure for connecting between the proximal side end link member 15 and the intermediate link member 17, and a structure for attaching the orientation controlling actuator 10 will be described with reference to FIG. 8 that is a partially enlarged view of FIG. 5.

The rotation shaft 22 has a large diameter portion 22a, a small diameter portion 22b and a male screw portion 22c, and is rotatably supported by the rotation shaft connection member 21 through two bearings 23 at the small diameter portion 22b. The bearing 23 is a ball bearing such as a deep groove ball bearing or an angular contact ball bearing. The bearings 23 are disposed so as to be fitted into an inner diameter groove 24 formed in the rotation shaft connection member 21, and are fixed by a method such as press-fitting, adhesion or crimping. The kind of the bearings provided in other revolute pair portions and a method for setting the bearings provided therein are the same as described above.

The rotation shaft 22 is disposed in an output shaft 52a of a speed reducer mechanism 52 (described below) at the large diameter portion 22a so as to be coaxial with the output shaft 52a. The disposition structure will be described below. The one end of the proximal side end link member 15 is connected to the rotation shaft 22 so as to rotate integrally with the rotation shaft 22. That is, the rotation shaft connection member 21 is disposed in a cut portion 25 formed at the one end of the proximal side end link member 15. The small diameter portion 22b of the rotation shaft 22 is inserted through the through holes formed in a pair of inner and outer rotation shaft support portions 26 and 27 that are both side portions of the cut portion 25 at the one end of the proximal side end link member 15, and through insides of inner rings of the bearings 23. The proximal side end link member 15 and the output shaft 52a of the speed reducer mechanism 52 are fixed by bolts 29 through a spacer 28 that is fitted to the outer circumference of the large diameter portion 22a of the rotation shaft 22. A nut 30 is screwed with the male screw portion 22c, of the rotation shaft 22, which projects from the outer rotation shaft support portion 27. Spacers 31 and 32 are provided between the inner rings of the bearings 23 and the pair of the rotation shaft support portions 26 and 27, and preload is applied to the bearings 23 during screwing of the nut 30.

A rotation shaft 35, which is rotatably connected to the one end of the intermediate link member 17, is connected to the other end of the proximal side end link member 15. The rotation shaft 35 of the intermediate link member 17 has a large diameter portion 35a, a small diameter portion 35b and a male screw portion 35c, similarly to the rotation shaft 22 of the link hub 12, and is rotatably supported by the one end of the intermediate link member 17 through two bearings 36 at the small diameter portion 35b. That is, the one end of the intermediate link member 17 is disposed in a cut portion 37 formed at the other end of the proximal side end link member 15, and the small diameter portion 35b of the rotation shaft 35 is inserted through the through holes formed in a pair of inner and outer rotation shaft support portions 38 and 39 that are both side portions of the cut portion 37 at the other end of the proximal side end link member 15, and through insides of inner rings of the bearings 36. A nut 40 is screwed with the male screw portion 35c, of the rotation shaft 35, which projects from the outer rotation shaft support portion 39. Spacers 41 and 42 are provided between the inner rings of the bearings 36 and the pair of the rotation shaft support portions 38 and 39, and preload is applied to the bearings 36 during screwing of the nut 40.

The orientation controlling actuator 10 is a motor which includes the speed reducer mechanism 52, and is disposed on the lower surface of the proximal member 20 of the proximal end side link hub 12 so as to be coaxial with the rotation shaft 22, as shown in FIG. 5. The orientation controlling actuators 10 are disposed so as to be oriented outward with respect to the three link mechanisms 14. The orientation controlling actuator 10 and the speed reducer mechanism 52 are integrally provided, and the speed reducer mechanism 52 is fixed to the proximal member 20 by a motor fixing member 53. In this example, all of the three link mechanisms 14 have the orientation controlling actuators 10. However, when at least two of the three link mechanisms 14 have the orientation controlling actuators 10, orientation of the distal end side link hub 13 relative to the proximal end side link hub 12 can be determined.

The speed reducer mechanism 52 is of a flange output type, and has the output shaft 52a having a large diameter. The end surface of the output shaft 52a includes a planar flange surface 54 that is perpendicular to the center line of the output shaft 52a. The output shaft 52a is connected to the rotation shaft support portion 26 of the proximal side end link member 15 through the spacer 28 by the bolts 29. The large diameter portion 22a of the rotation shaft 22 at the revolute pair portion between the proximal end side link hub 12 and the proximal side end link member 15 is fitted into an inner diameter groove 57 provided in the output shaft 52a of the speed reducer mechanism 52.

A structure for connecting between the distal end side link hub 13 and the distal side end link member 16 and a structure for connecting between the distal side end link member 16 and the intermediate link member 17 are same as the structure for connecting between the proximal end side link hub 12 and the proximal side end link member 15 and the structure for connecting between the proximal side end link member 15 and the intermediate link member 17 as described above. Therefore, the description thereof is omitted.

The two link actuation devices 7 above-described are each mounted such that the proximal end side link hub 12 is fixed to the XY stage 6 and the distal end side link hub 13 is oriented downward. At this time, as shown in FIG. 2, the openings 20a of the proximal members 20 of the two link actuation devices 7, respectively, are oriented so as to oppose each other. That is, the respective link mechanisms 14 with the separation angle δ1 of 180° in the two link actuation devices 7 are disposed to confront with each other. In this embodiment, the two opening 20a (two portions where the separation angle δ1 is 180°) oppose each other in the left-right direction (X-axis direction).

The end effector 3 shown in FIG. 1 is attached to the distal end side link hub 13 such that the upper-lower center portion of the end effector 3 is fitted into a recess 43a (FIG. 6), of the U-shaped distal member 43. For example, in a case where the end effector 3 is a grease application machine, the end effector 3 is attached such that a grease nozzle is oriented downward.

In the combination type link actuation device 1, the two link actuation devices 7 are moved, by the XY stages 6, in the left-right direction (X-axis direction) and the front-rear direction (Y-axis direction), and work is performed on the workpieces 2 by using the end effectors 3 while the orientation of the end effector 3 is changed by each link actuation device 7. As shown in FIG. 1, the two end effectors 3 may be used to perform work on the two workpieces 2, respectively. Alternatively, the two end effectors 3 may be used to simultaneously perform work on a single workpiece 2. In the example shown in FIG. 1, the number of the workpieces 2 is two. However, three or more workpieces 2 may be placed.

The orientation of the end effector 3 can be changed by the link actuation device 7 at a high speed and with high accuracy, and therefore, operation can be performed at a high speed and with high accuracy. The position of the link actuation device 7 is changed by the XY stage 6, and the orientation of the end effector 3 is changed by the link actuation device 7. Thus, work on various surfaces of the workpiece 2 can be performed at various angles. The two link actuation devices 7 and the two XY stages 6 are controlled so as to cooperate with each other, whereby a complicated work can be performed.

Figure 9:
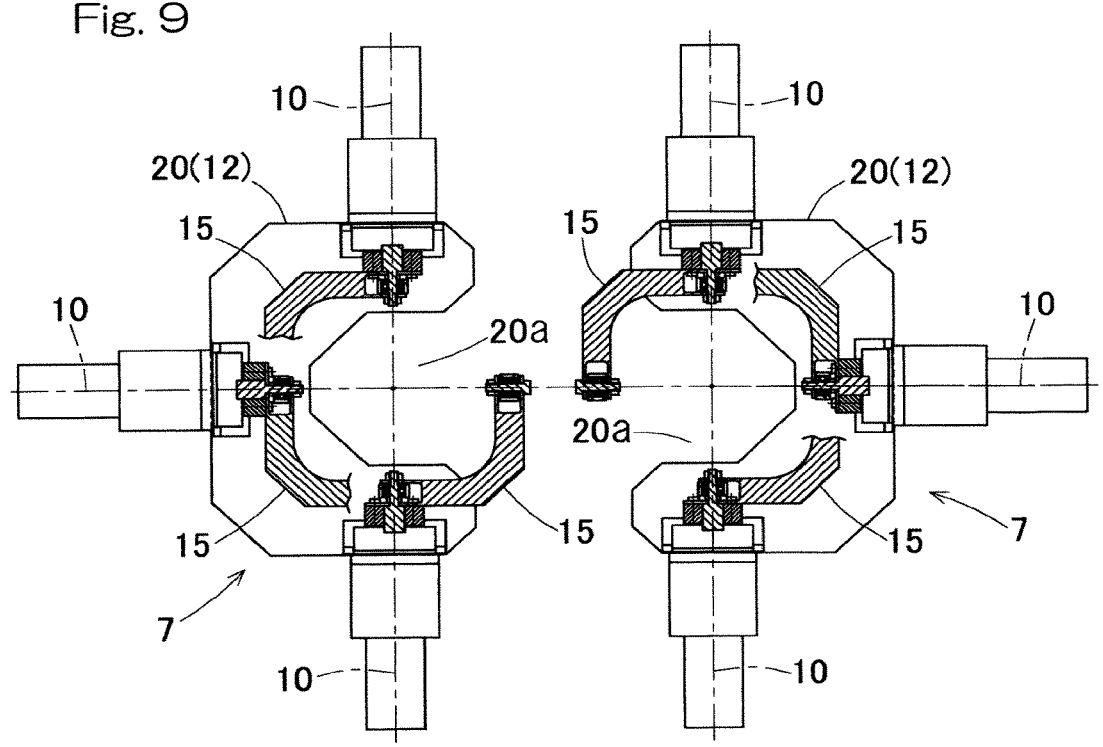
FIG. 9 is a partially cutaway view illustrating a state where proximal end side link hubs of the two link actuation devices of the combination type link actuation device are close to each other.
Figure 10:
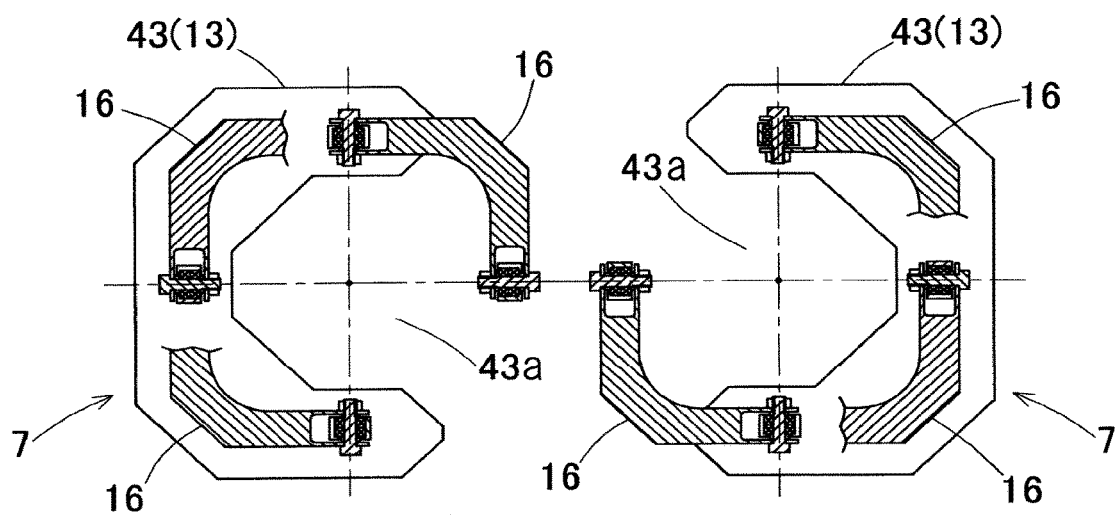
FIG. 10 is a partially cutaway view illustrating a state where distal end side link hubs of the two link actuation devices of the combination type link actuation device are close to each other.
Figure 21:
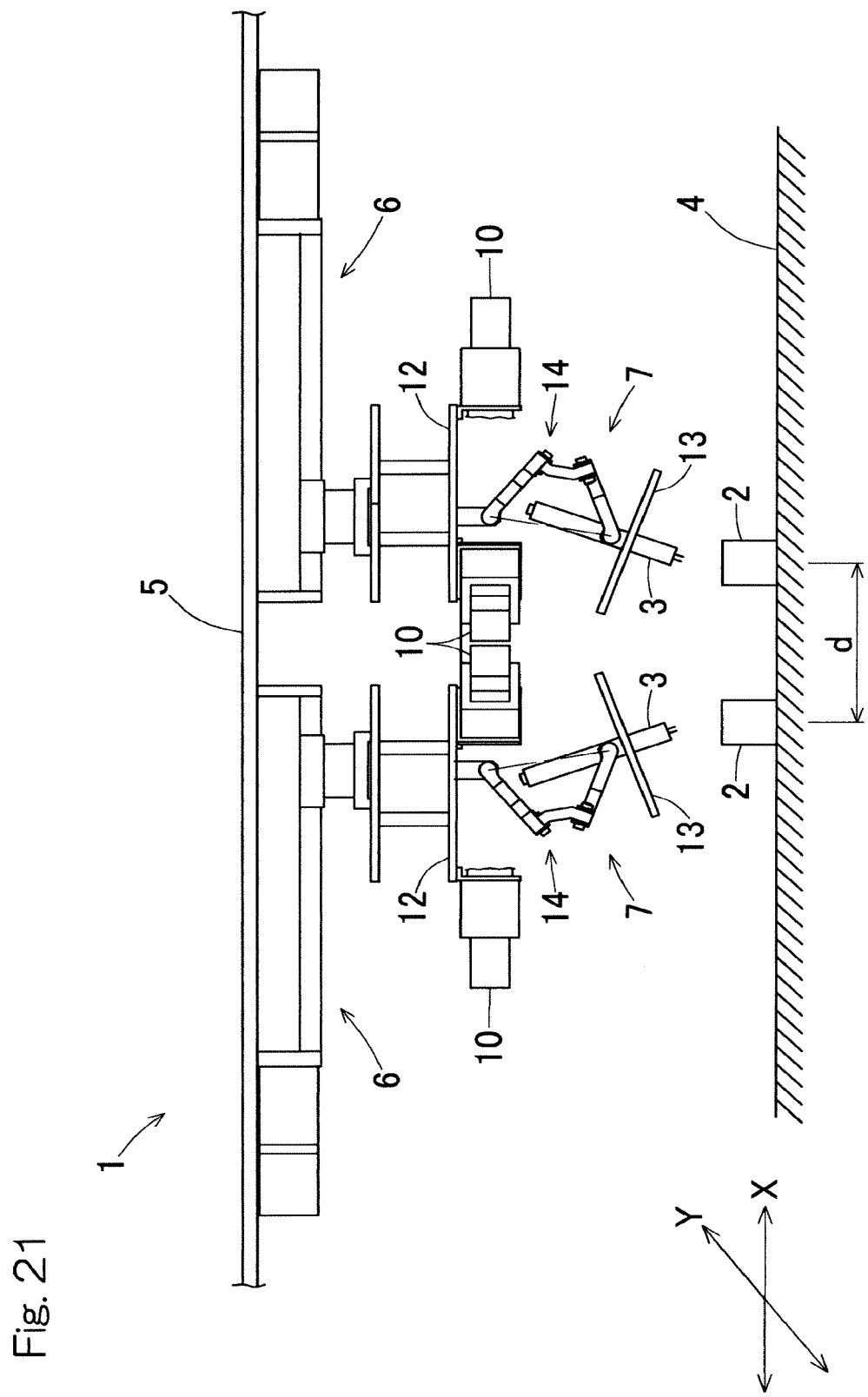
FIG. 21 is a front view of a combination type link actuation device according to an examination example.
Figure 22:
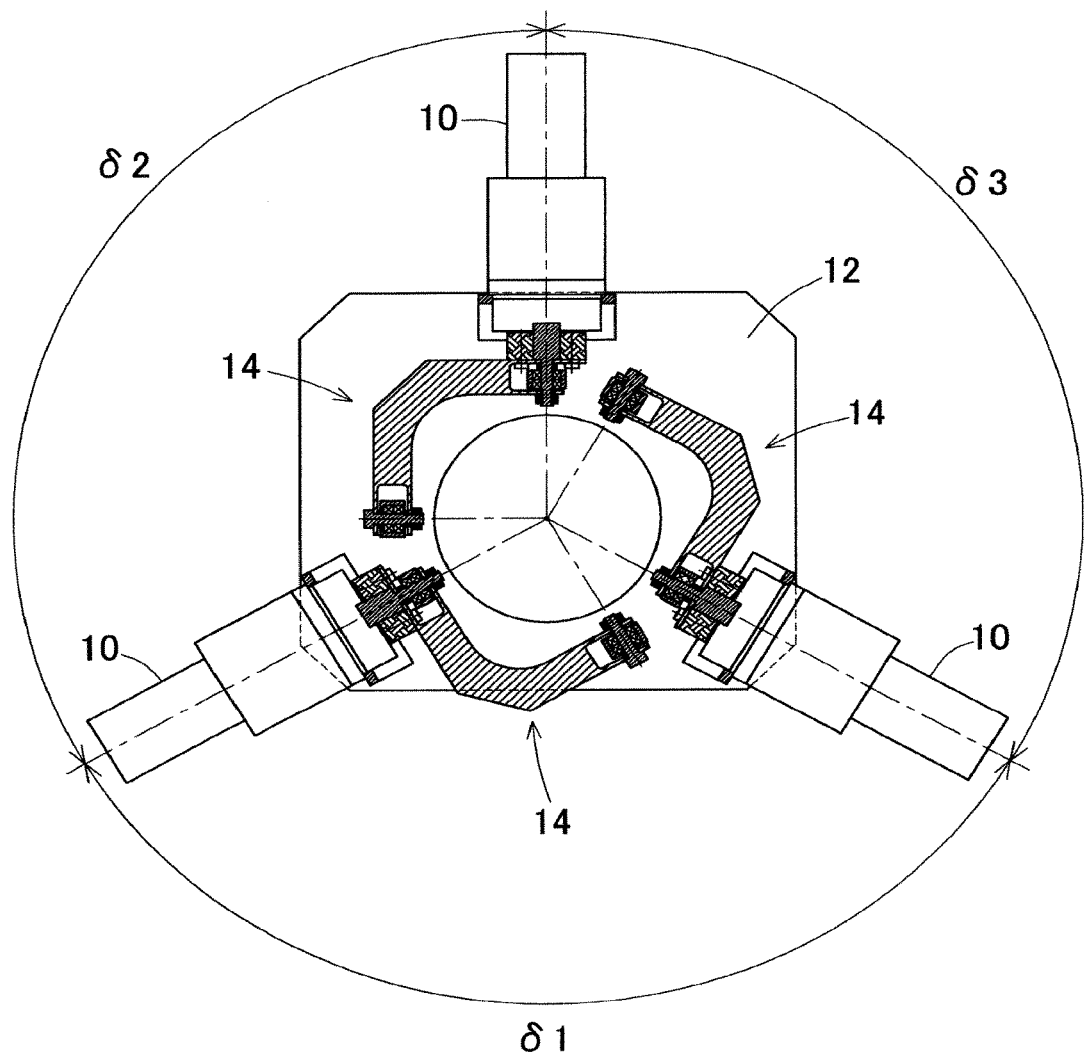
FIG. 22 partially illustrates, as a cutaway view, a proximal end side link hub, a proximal side end link member, an orientation controlling actuator and the like of a conventional link actuation device.

The two link actuation devices 7 are disposed such that portions, of the two link mechanisms 14, where the separation angle δ1 is 180° oppose each other. Therefore, the two link actuation devices 7 can be positioned so as to be close to each other. Specifically, as shown in FIG. 9 and FIG. 10, the proximal end side link hubs 12 of the two link actuation devices 7 can be made close to each other, and the distal end side link hubs 13 thereof can be made close to each other. Therefore, as shown in FIG. 1, in a case where work is performed, on the two or more workpieces 2 disposed in parallel, by the end effectors 3 disposed in the distal end side link hubs 13, a distance d between the two workpieces 2, 2 can be reduced. It can be found that the distance d between the two workpieces 2, 2 can be reduced as compared to the combination type link actuation device 1 according to the examination example shown in FIG. 21. When the distance d between the two workpieces 2, 2 is short, a workpiece transporting tool used for carrying the workpieces 2 into and from a working position can be reduced in size. Furthermore, a space occupied by the two link actuation devices 7 is reduced, and thus, the entirety of the combination type link actuation device 1 is made compact.

The link actuation device 7 allows an operation range to be widened while it is compact as described above. Therefore, a part of the mechanism for changing orientation may be merely positioned around the end effector 3 as compared to a case where the orientation of the end effector is similarly changed by using another mechanism. Thus, the end effector 3 can be made close to the workpiece 2 so as to perform work thereon, and the entirety of the combination type link actuation device 1 can be made more compact.

The proximal member 20 of the proximal end side link hub 12 has a U-shape that is opened on the side where the separation angle δ1 is 180°. Therefore, carrying-in and carrying-out of the workpiece 2 disposed in the link actuation device 7, attaching and detaching of the end effector 3, and maintenance of the end effector 3 can be facilitated.

Figure 11:
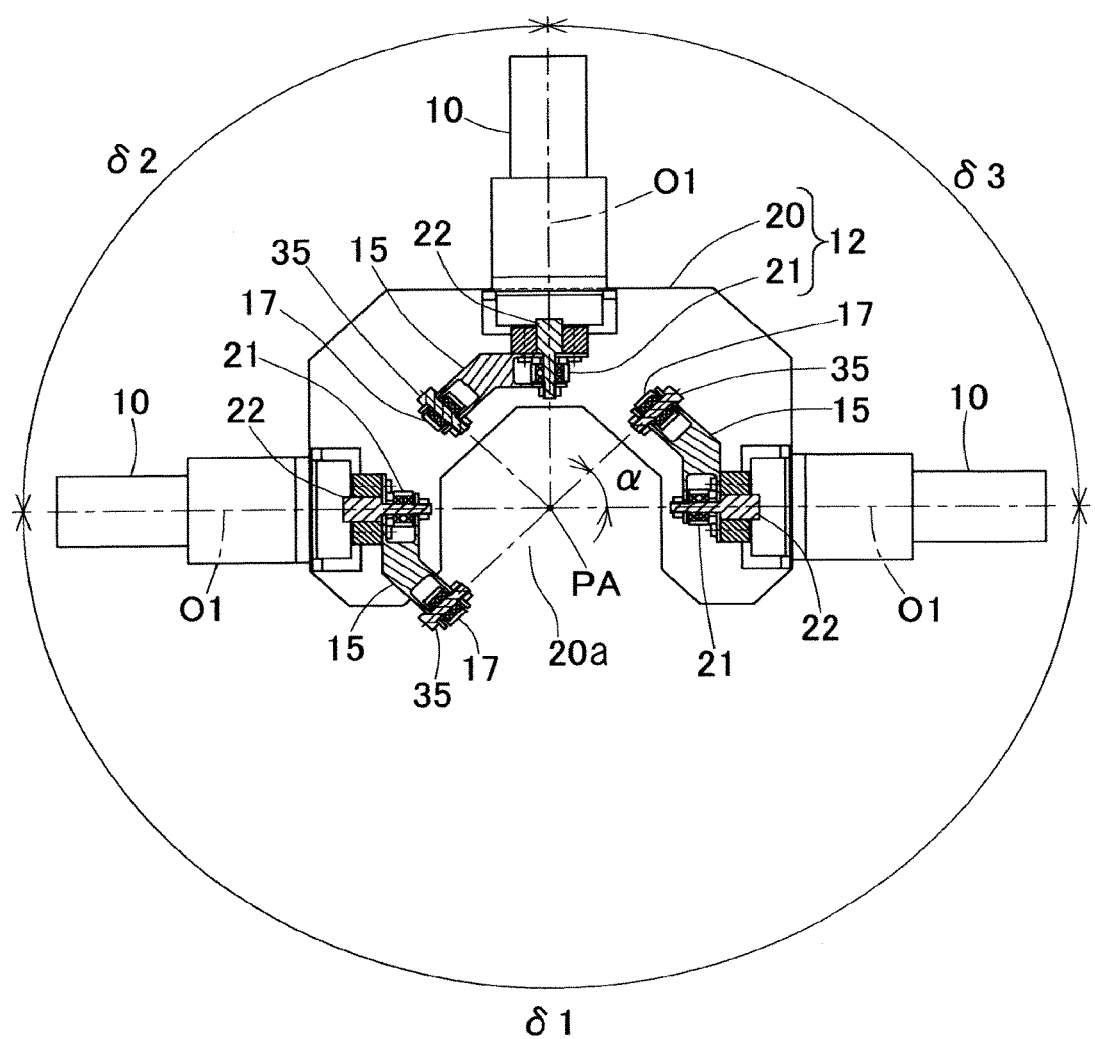
FIG. 11 is a partially cutaway view of a link actuation device having a structure different from the structure shown in FIG. 5 and FIG. 6 as viewed from the center portion thereof toward a proximal end side.
Figure 12:
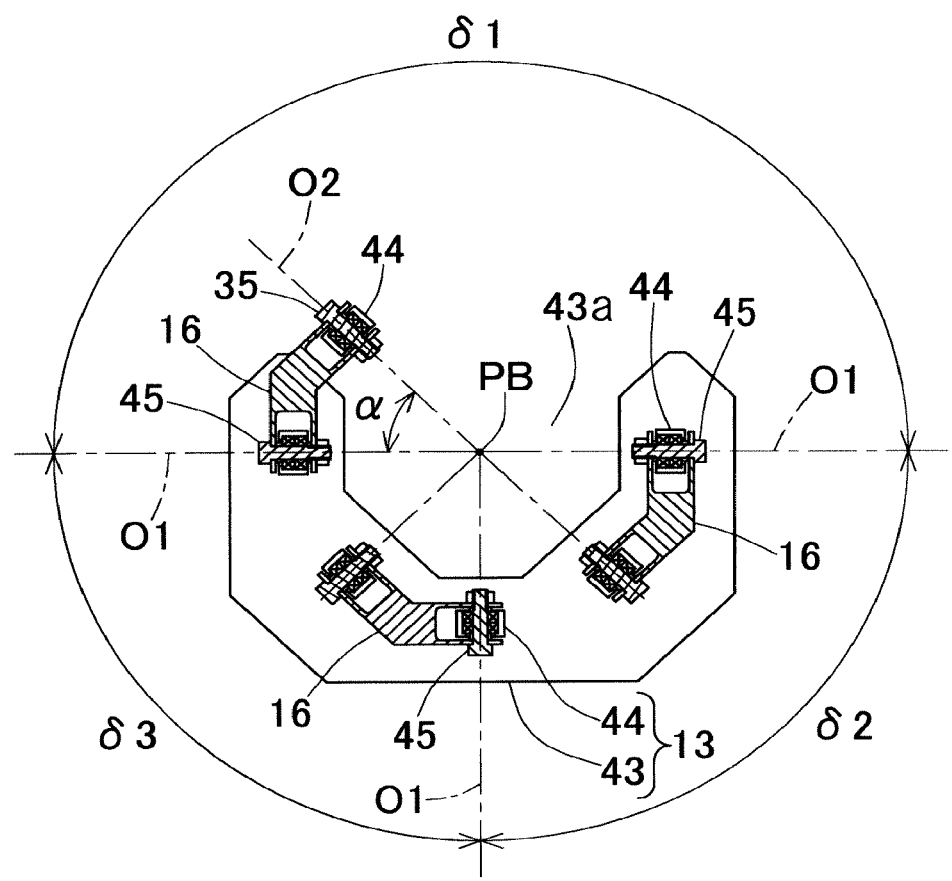
FIG. 12 is a partially cutaway view of the link actuation device shown in FIG. 11 as viewed from the center portion thereof toward a distal end side.

FIG. 11 and FIG. 12 illustrate an example where the arm angle α for each of the proximal side end link member 15 and the distal side end link member 16 is not greater than 90°. In the illustrated example, the arm angle α is 45°. When the arm angle α is not greater than 90° as in this example, interference among the link members 15, 16, 17 is less likely to occur, and thus, an operation range of the link actuation device 7 is widened. Furthermore, a space among the link members 15, 16, 17 can be assured. Therefore, carrying-in and carrying-out of the workpiece 2 disposed in the link actuation device 7, attaching and detaching of the end effector 3, and maintenance of the end effector 3 can be facilitated.

Figure 13:
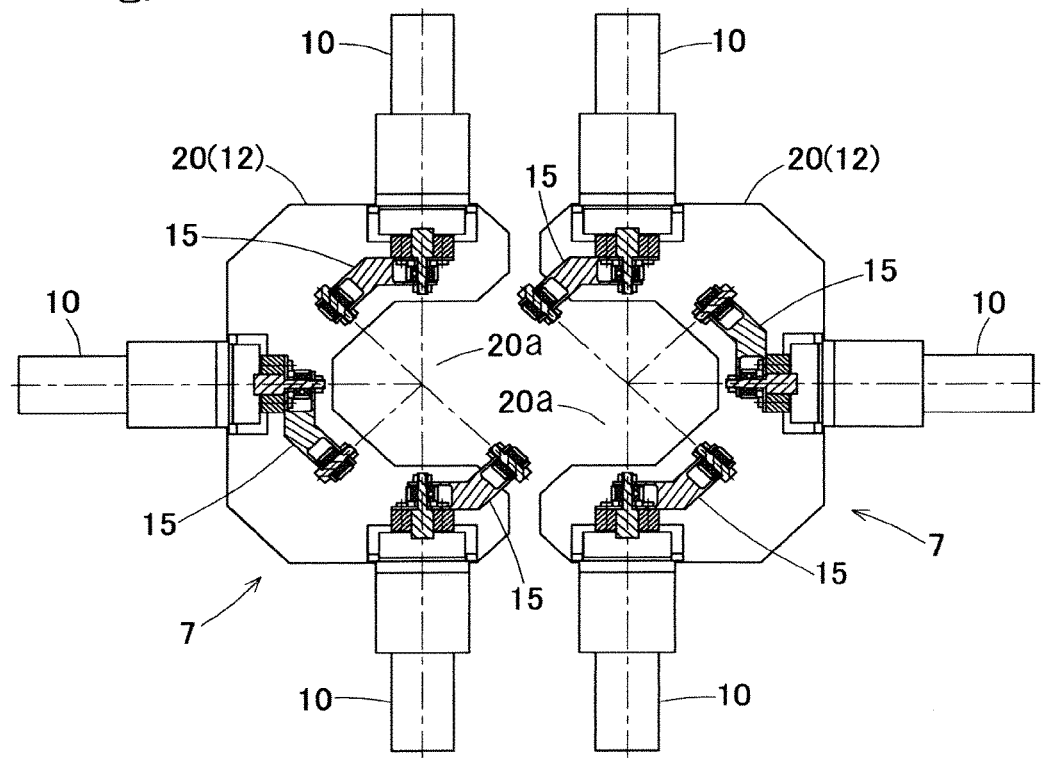
FIG. 13 is a partially cutaway view illustrating a state where proximal end side link hubs of the two link actuation devices of the combination type link actuation device shown in FIGS. 11-12 are close to each other.
Figure 14:
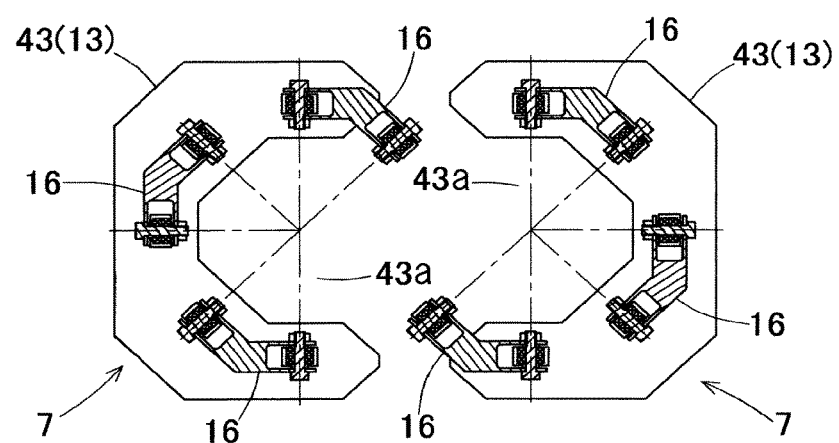
FIG. 14 is a partially cutaway view illustrating a state where distal end side link hubs of the two link actuation devices of the combination type link actuation device shown in FIGS. 11-12 are close to each other.
Figure 15:
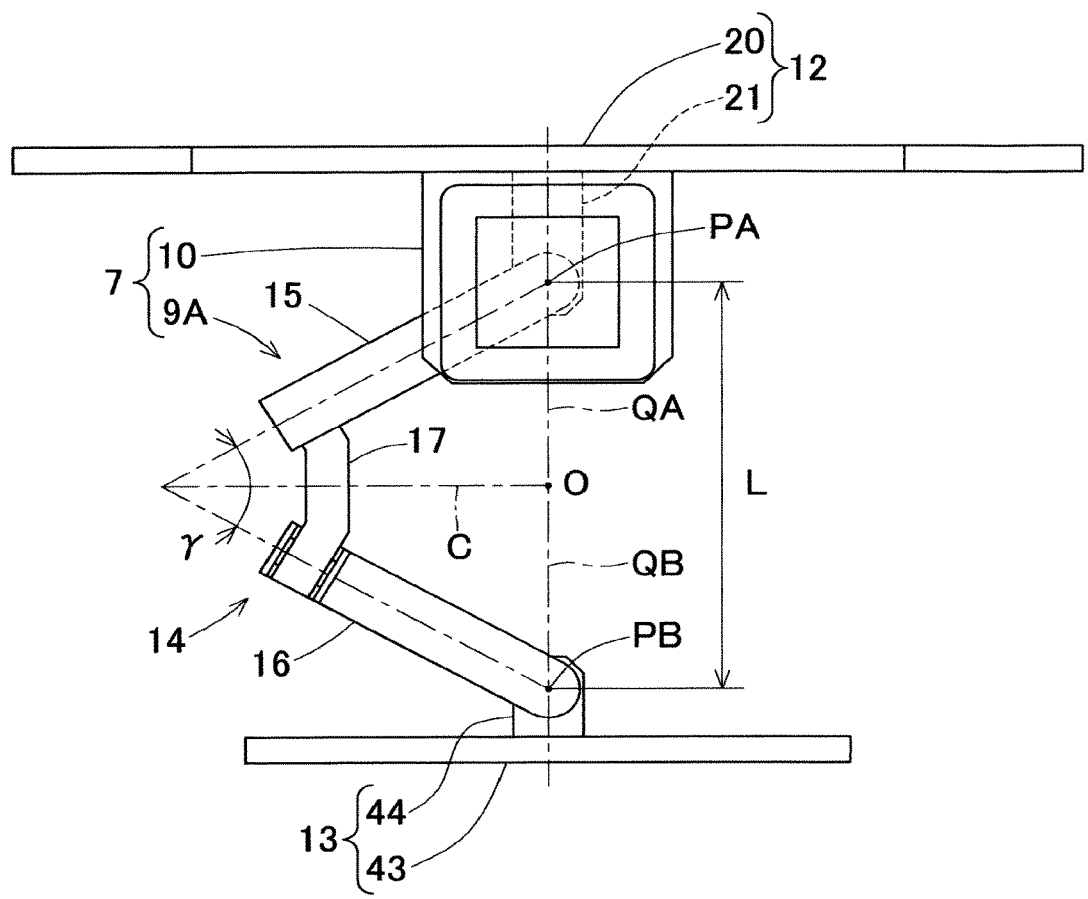
FIG. 15 is a front view of a part of a link actuation device that includes a parallel link mechanism having a different structure.

When the arm angle is not greater than 90°, the proximal end side link hubs 12 of the two link actuation devices 7 can be made close to each other, and the distal end side link hubs 13 thereof can be made close to each other as shown in FIG. 13 and FIG. 14 as compared to a case (see FIG. 9, FIG. 10) where the arm angle α is 90°. Therefore, the workpiece transporting tool can be further reduced in size, and the entirety of the combination type link actuation device 1 can be made more compact.

The link actuation device 7 shown in FIGS. 1-14 described above has the parallel link mechanism 9 that is of a mirror-symmetric type. However, as in the link actuation device 7 shown in FIG. 15 to FIG. 19, a parallel link mechanism 9A of a rotation symmetric type may be used.

The structural portions that are the same between the link actuation device 7 having the parallel link mechanism 9A of a rotation symmetric type, and the link actuation device 7 having the parallel link mechanism 9 that is of a mirror-symmetric type, are not described, and are denoted by the same reference characters.

Figure 16:
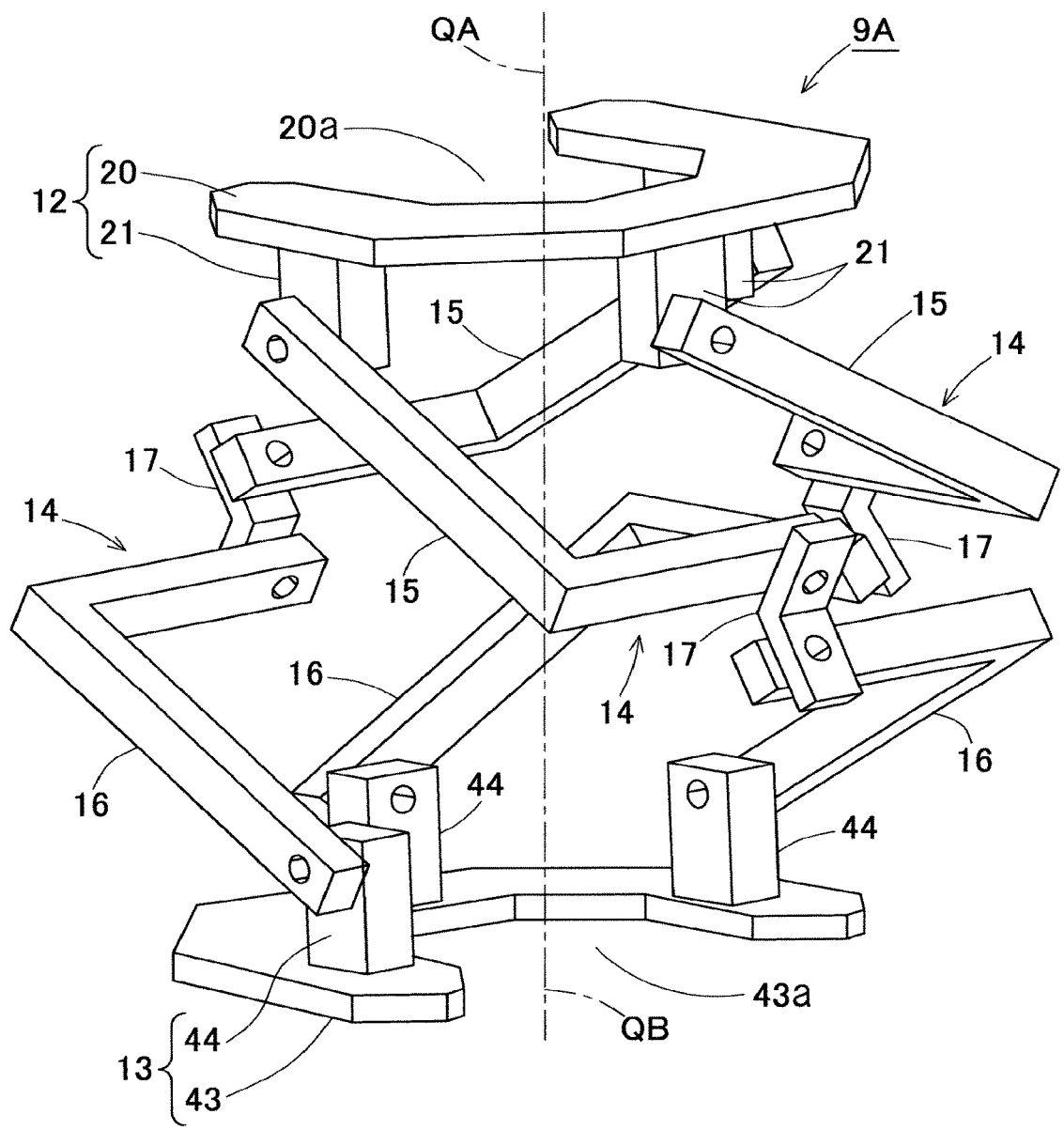
FIG. 16 is a perspective view of the parallel link mechanism of the link actuation device shown in FIG. 15.
Figure 17:
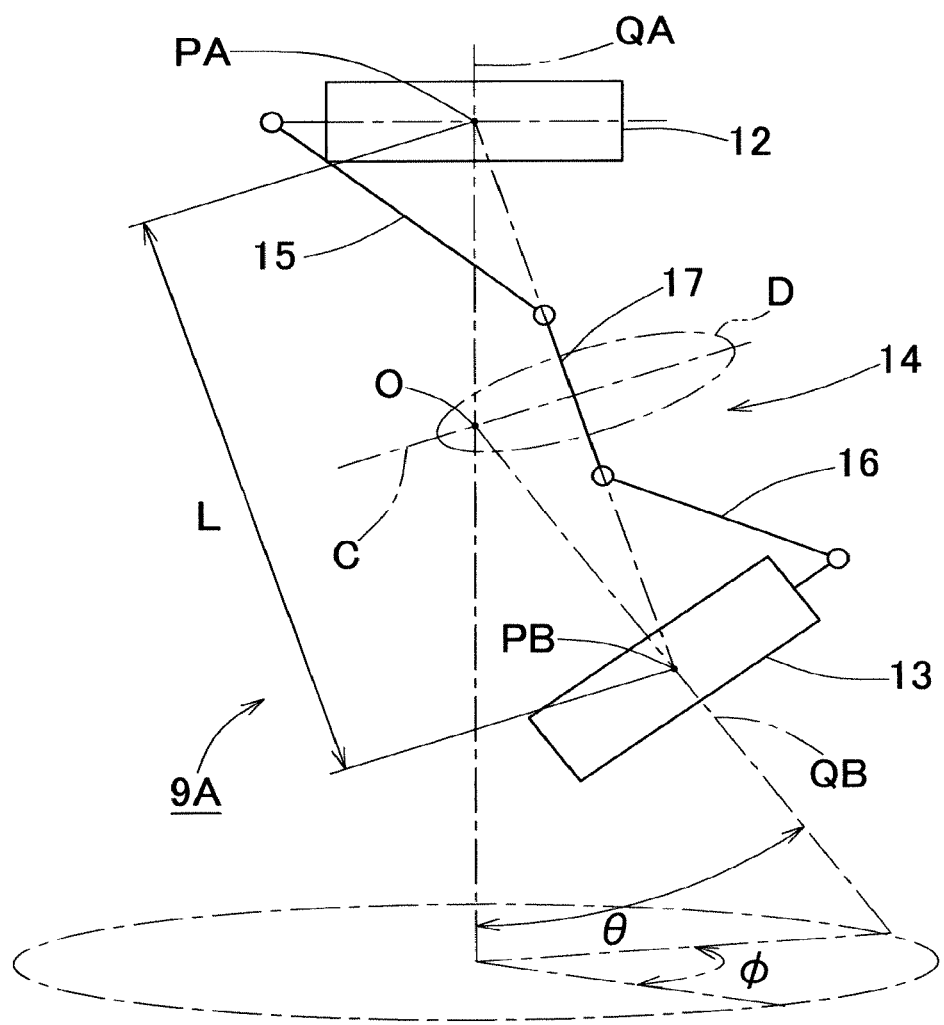
FIG. 17 illustrates one link mechanism, of the parallel link mechanism shown in FIG. 16, which is represented as a straight line.
Figure 18:
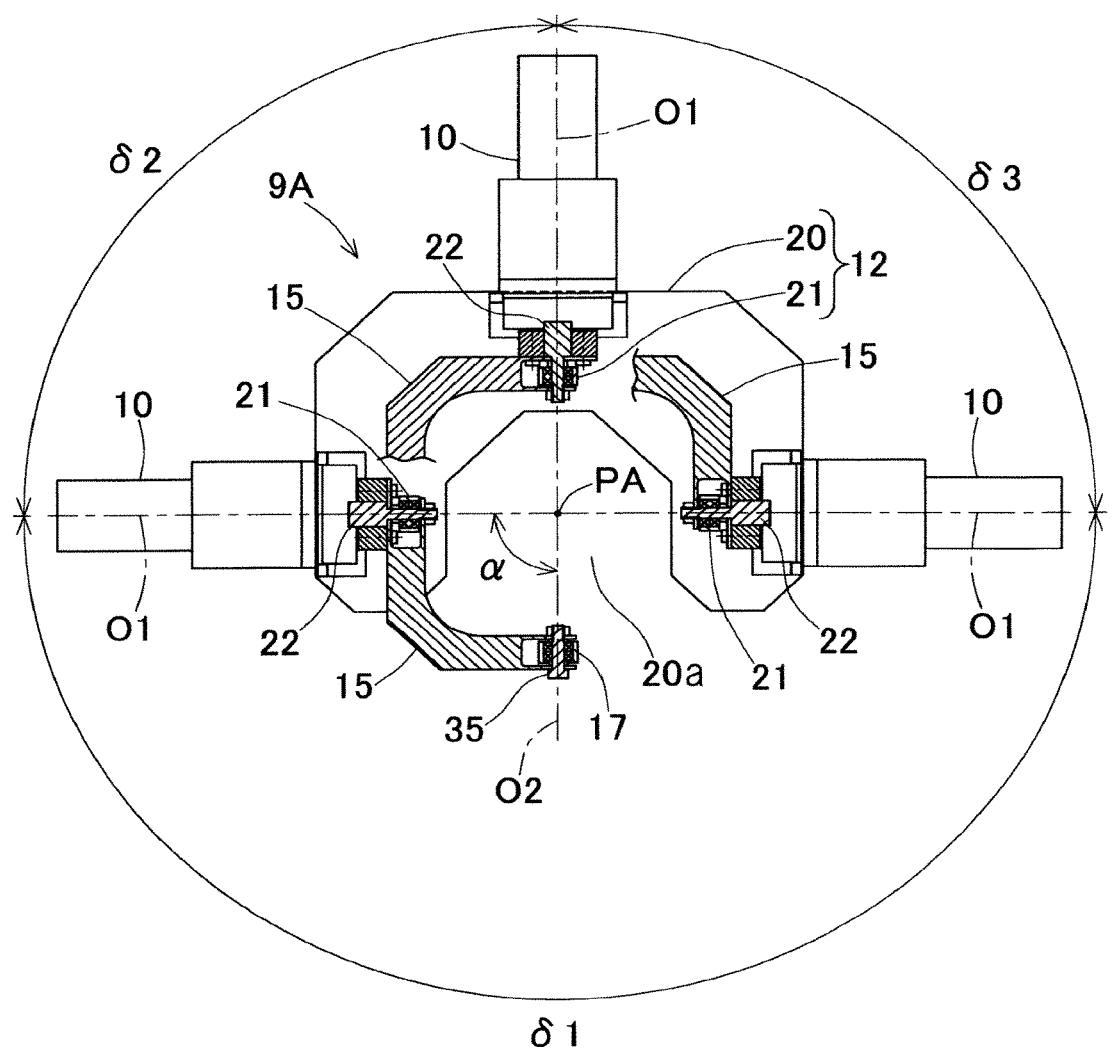
FIG. 18 is a partially cutaway view of the link actuation device shown in FIG. 15 as viewed from the center portion thereof toward a proximal end side.

In the parallel link mechanism 9A of the rotation symmetric type, as shown in FIG. 16 and FIG. 17, a positional relationship between: the proximal end side portion composed of the proximal end side link hub 12 and the proximal side end link member 15; and the distal end side portion composed of the distal end side link hub 13 and the distal side end link member 16 represents rotation symmetry about the center line C (FIG. 17) of the intermediate link member 17. The center portion of each intermediate link member 17 is positioned at a common orbital circle D.

Similarly to the parallel link mechanism 9 of the mirror-symmetric type, in the parallel link mechanism 9A of the rotation symmetric type, the proximal end side portion composed of the proximal end side link hub 12 and the proximal side end link member 15 operate in the same manner as the distal end side portion composed of the distal end side link hub 13 and the distal side end link member 16 due to geometrical symmetry. However, in the parallel link mechanism 9 of the rotation symmetric type, the arm angle α (FIG. 18, 19) for the proximal side and distal side end link members 15, 16 is restricted to 90° or a value close to 90° in order to allow the three link mechanisms 14 to operate without interfering with each other, as in the illustrated example.

Figure 19:
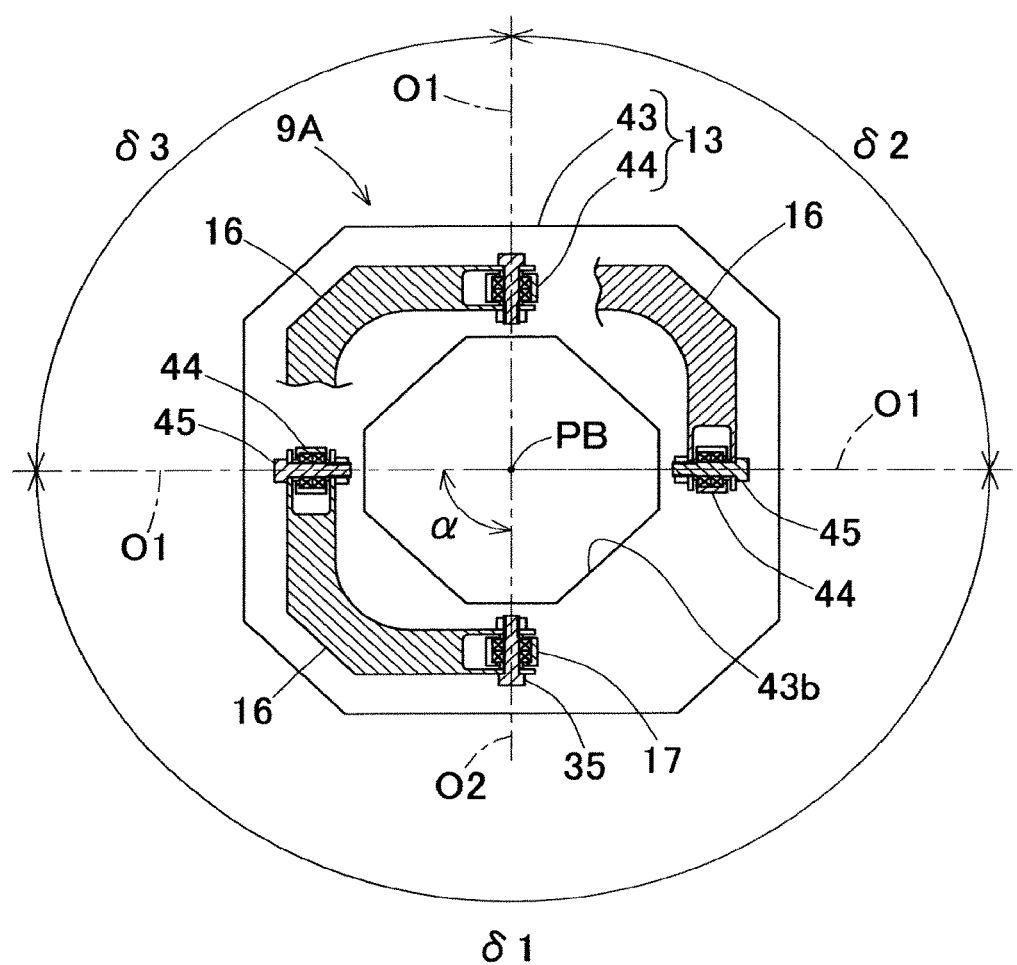
FIG. 19 is a partially cutaway view of the link actuation device shown in FIG. 15 as viewed from the center portion thereof toward a distal end side.

In the parallel link mechanism 9A of the rotation symmetric type, phase in the circumferential direction is shifted by 180° between on the proximal end side and on the distal end side. Therefore, if both the proximal member 20 and the distal member 43 are U-shaped, the opening of the proximal member 20 and the opening of the distal member 43 are positioned on sides opposite to each other (see FIG. 16). Therefore, even if the distal member 43 is U-shaped, a great effect is not expected. Accordingly, as illustrated in FIG. 19, the distal member 43 has a square-like shape having a through hole 43b at the center thereof.

Another embodiment of the present invention will be described. In the following description, portions corresponding to the matters described in the preceding embodiment are designated by the same reference numerals in the present embodiment, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 20:
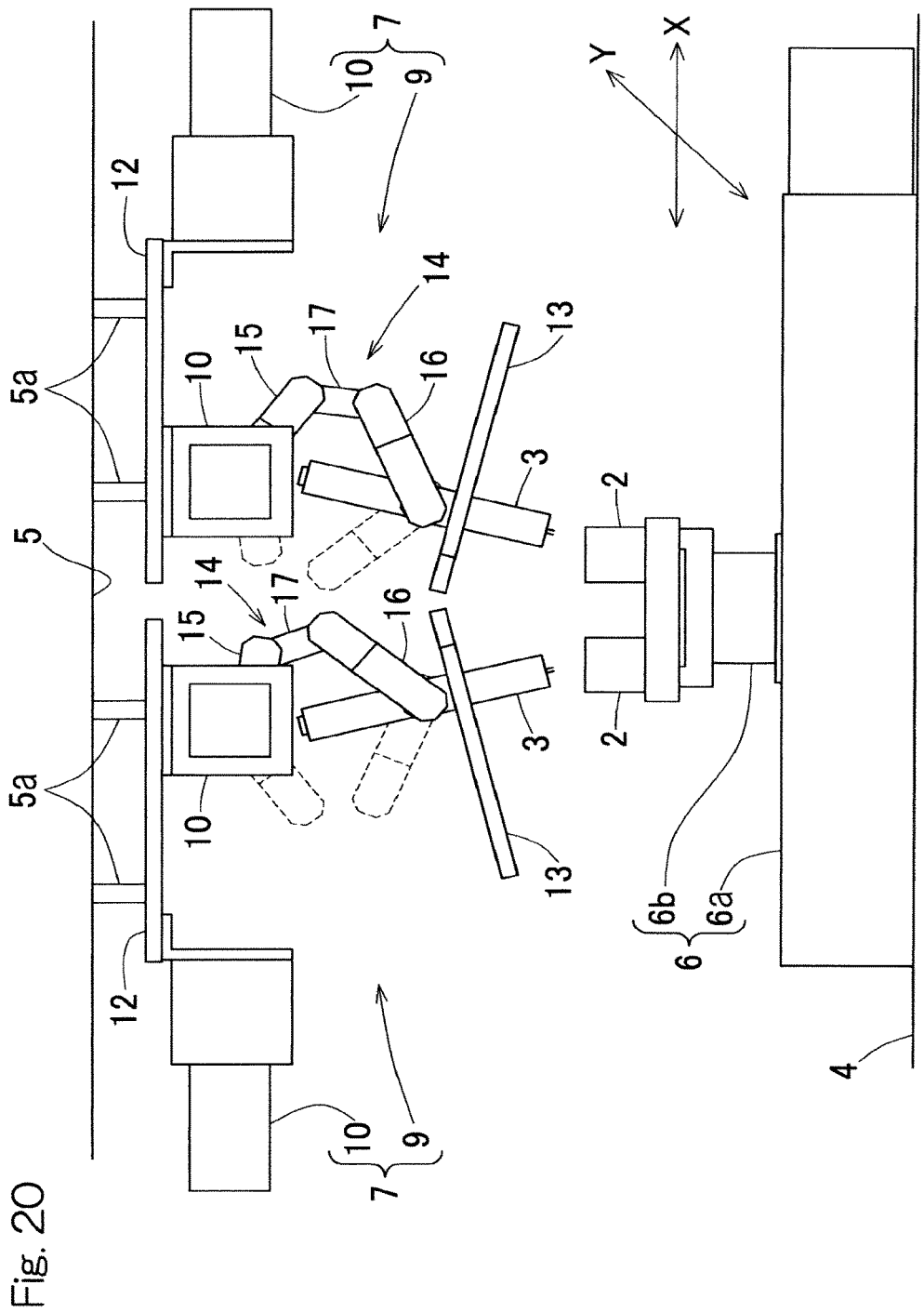
FIG. 20 is a front view of a combination type link actuation device according to a second embodiment of the present invention.

FIG. 20 illustrates a second embodiment. In the combination type link actuation device 1, two workpieces 2 are placed on the XY stage 6 set on the floor surface 4 or a conveyor, and the two link actuation devices 7 are provided at fixed positions on the top plate 5. In the link actuation device 7, the proximal end side link hub 12 is fixed to the top plate 5 through a support member 5a, and the end effector 3 is attached to the distal end side link hub 13. Also in this case, the two link actuation devices 7 are disposed such that portions, of the two link mechanisms 14, where the separation angle δ1 is 180° oppose each other.

In the combination type link actuation device 1 according to the second embodiment, the two workpieces 2 are moved by the XY stage 6 in the left-right direction (X-axis direction) and the front-rear direction (Y-axis direction), and work on the workpieces 2 is performed from thereabove by the end effectors 3 while the link actuation devices 7 change the orientations of the end effectors 3. The second embodiment has the same function and effect as obtained in the structure of the first embodiment shown in FIG. 1.

The workpiece 2 may be moved in the left-right direction (X-axis direction) by an X-axis linear motion actuator (not shown), and each link actuation device 7 may be moved in the front-rear direction (Y-axis direction) by a Y-axis linear motion actuator (not shown). Alternatively, the workpiece 2 may be moved in the front-rear direction (Y-axis direction) by a Y-axis linear motion actuator (not shown) and each link actuation device 7 may be moved in the left-right direction (X-axis direction) by an X-axis linear motion actuator (not shown).

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . combination type link actuation device
2 . . . workpiece
3 . . . end effector
6 . . . XY stage
6a . . . X-axis linear motion actuator
6b . . . Y-axis linear motion actuator
7 . . . link actuation device
10 . . . orientation controlling actuator
12 . . . proximal end side link hub
13 . . . distal end side link hub
14 . . . link mechanism
15 . . . proximal side end link member
16 . . . distal side end link member
17 . . . intermediate link member
20 . . . proximal member (proximal end side link hub)
43 . . . distal member (distal end side link hub)
O1 . . . center axis of revolute pair between proximal end side link hub and proximal side end link member (center axis of revolute pair between distal end side link hub and distal side end link member)
O2 . . . center axis of revolute pair between proximal side end link member and intermediate link member (center axis of revolute pair between distal side end link member and intermediate link member)
α . . . arm angle
δ1, δ2, δ3 . . . separation angle

What is claimed is:

1. A combination type link actuation device having two link actuation devices combined with each other, wherein
each link actuation device comprises: a proximal end side link hub; a distal end side link hub; and three link mechanisms aligned in a circumferential direction, the three link mechanisms connecting the proximal end side link hub with the distal end side link hub such that an orientation of the distal end side link hub is changed relative to the proximal end side link hub, each link mechanism includes: a proximal side end link member having one end that is rotatably connected to the proximal end side link hub; a distal side end link member having one end rotatably connected to the distal end side link hub; and an intermediate link member having opposite ends that are rotatably connected to other ends of the proximal side end link member and the distal side end link member, two or more link mechanisms among the three link mechanisms have an orientation controlling actuator therein, the orientation controlling actuator to change an orientation of the distal end side link hub relative to the proximal end side link hub, and at least one separation angle among a plurality of separation angles, in the circumferential direction, of the three link mechanisms is greater than 120°, and the respective link mechanisms with the separation angle greater than 120° in the two link actuation devices are disposed to oppose each other.

2. The combination type link actuation device as claimed in claim 1, wherein at least one of the link actuation devices is attached to one or more linear motion actuators.

3. The combination type link actuation device as claimed in claim 1, wherein one separation angle among the plurality of separation angles is 180°.

4. The combination type link actuation device as claimed in claim 1, wherein an arm angle is an angle formed by: a first center axis of a first revolute pair between the proximal end side link hub and the proximal side end link member; and a second center axis of a second revolute pair between the proximal side end link member and the intermediate link member, and is an angle formed by: a third center axis of a third revolute pair between the distal side end link member and the distal end side link hub; and a fourth center axis of a fourth revolute pair between the distal side end link member and the intermediate link member, and the arm angle is not greater than 90°.

5. The combination type link actuation device as claimed in claim 1, wherein at least one of the proximal end side link hub and the distal end side link hub has a U-shape which is opened on a side where a separation angle of the plurality of separation angles is greater than 120°, as viewed in a direction perpendicular to a plane on which the proximal side and distal side end link members of the three link mechanisms are aligned.

\* \* \* \* \*